United States Patent [19]

Tanikoshi et al.

[11] Patent Number: 5,634,018
[45] Date of Patent: May 27, 1997

[54] PRESENTATION SUPPORTING METHOD AND APPARATUS THEREFOR

[75] Inventors: Koichiro Tanikoshi; Kimiya Yamaashi, both of Hitachi; Masayuki Tani, Katsuta; Shinya Tanifuji, Hitachi; Hitoshi Yoshino, Chiba, all of Japan

[73] Assignee: Hitachi, Ltd., Tokyo, Japan

[21] Appl. No.: 304,209

[22] Filed: Sep. 12, 1994

Related U.S. Application Data

[63] Continuation of Ser. No. 709,976, Jun. 4, 1991, abandoned.

[30] Foreign Application Priority Data

| Jun. 7, 1990 | [JP] | Japan | 2-147210 |
| Jun. 15, 1990 | [JP] | Japan | 2-155193 |

[51] Int. Cl.⁶ .................................................. G06F 15/00
[52] U.S. Cl. ........................... 395/329; 395/330; 395/800
[58] Field of Search .............................. 395/800, 153, 395/156, 157, 154, 329

[56] References Cited

U.S. PATENT DOCUMENTS

| 4,595,990 | 6/1986 | Garwin et al. ........................ 395/155 |
| 4,715,818 | 12/1987 | Shapiro et al. ...................... 434/118 |
| 4,775,935 | 10/1988 | Yourick ............................... 358/903 |
| 4,785,472 | 11/1988 | Shapiro ............................... 379/96 |
| 4,876,657 | 10/1989 | Saito et al. .......................... 395/153 |
| 4,882,743 | 11/1989 | Mahmoud ............................ 379/53 |
| 4,941,136 | 7/1990 | Breitung, II ........................... 368/8 |
| 4,974,173 | 11/1990 | Stefik et al. ........................ 364/521 |
| 5,003,532 | 3/1991 | Ashida et al. ....................... 370/62 |
| 5,303,042 | 4/1994 | Lewis et al. ........................ 348/14 |
| 5,307,456 | 4/1994 | Mackay .............................. 395/154 |

FOREIGN PATENT DOCUMENTS

| 10227 | 7/1986 | Japan . |
| 204315 | 2/1987 | Japan . |
| 70823 | 9/1987 | Japan . |

*Primary Examiner*—Parshotam S. Lall
*Assistant Examiner*—Zarni Maung
*Attorney, Agent, or Firm*—Antonelli, Terry, Stout & Kraus, LLP

[57] ABSTRACT

When presentation is made while displaying presentation information on both of audience-site and presenter-site screens, presenter-site additional information for supporting the progress of presentation is not displayed on the audience-site screen but displayed on the presenter-site screen. When drawing information displayed on the audience-site screen is to be displayed also on the presenter-site screen, the drawing information is displayed after abridged. When presentation is made by using a plurality of screens and when presentation information is to be displayed on any one of the screens, the presentation information is automatically assigned to any one of the screens by assignment deciding functions. As a result, the progress of presentation by the presenter can be smoothened.

28 Claims, 18 Drawing Sheets

FIG. 2B

| DISPLAY DATA "PROBLEM" | |
|---|---|
| OPERATION | String "PROBLEM" |
| DISPLAY AREA | (100,100) - (150,125) |
| DISPLAY CONTENTS | START BRING IF RIGHT PICK |
| | TERMINATE BRING IF LEFT PICK |

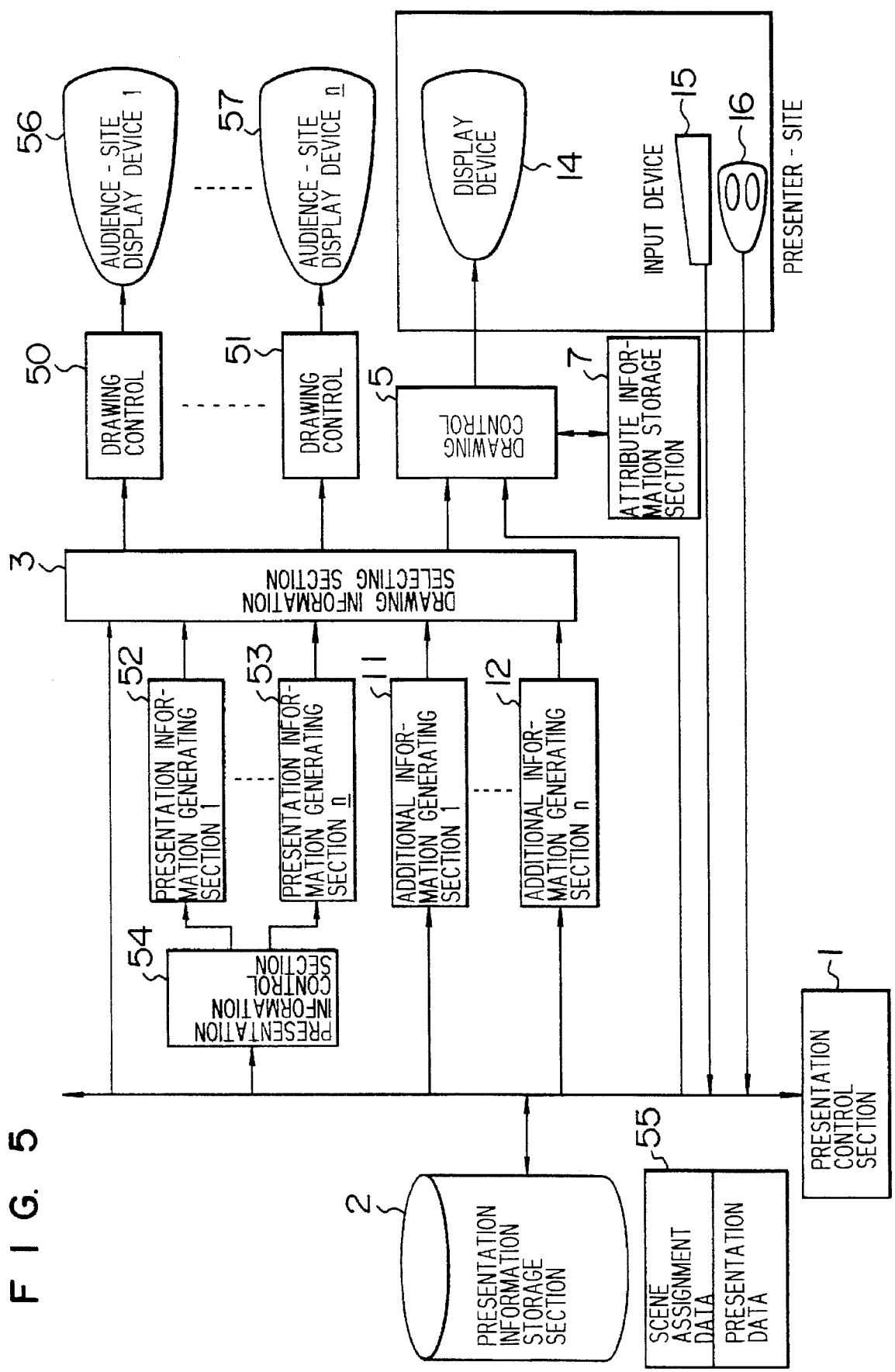
F I G. 5

F I G. 12
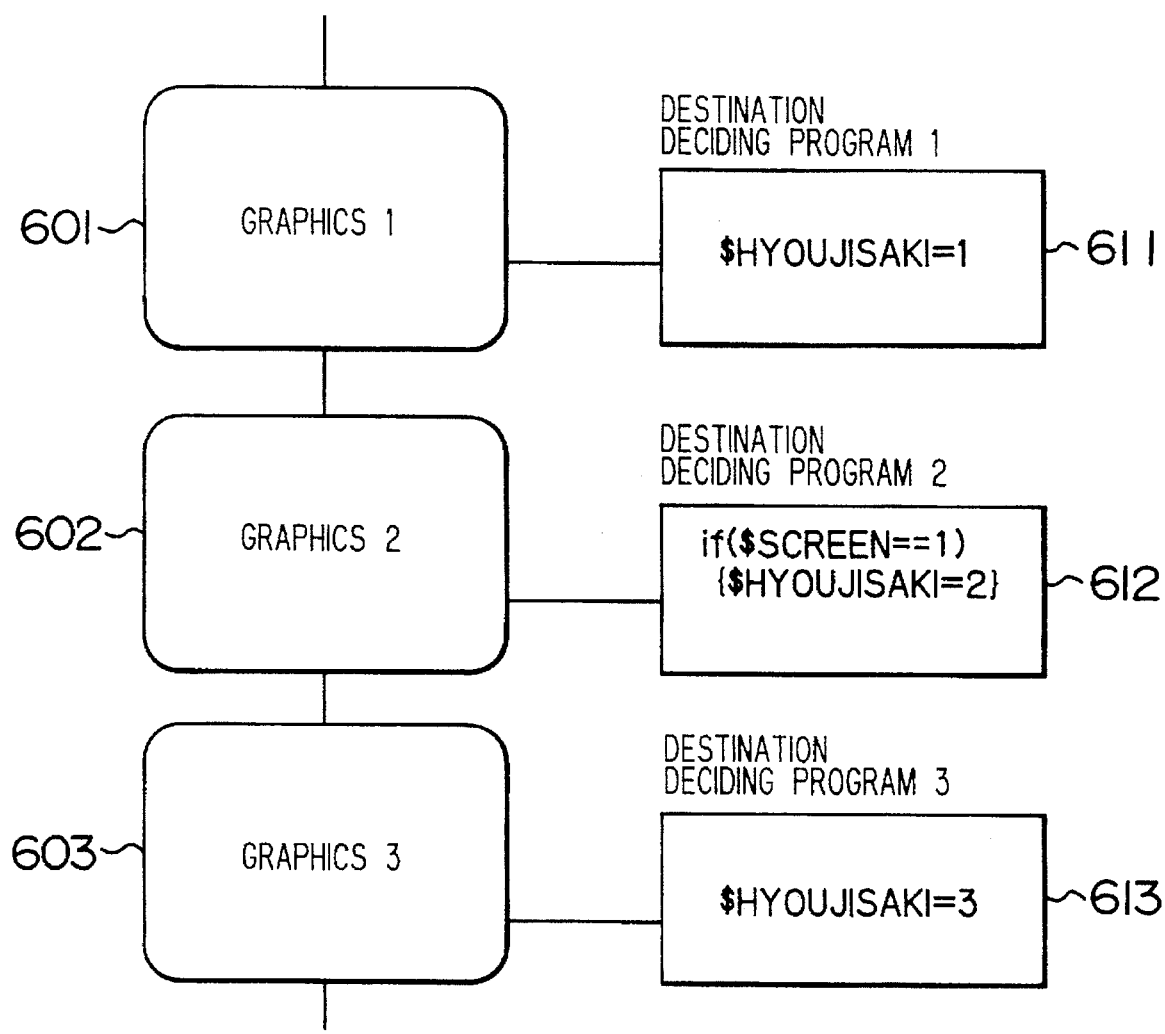

F I G. 14
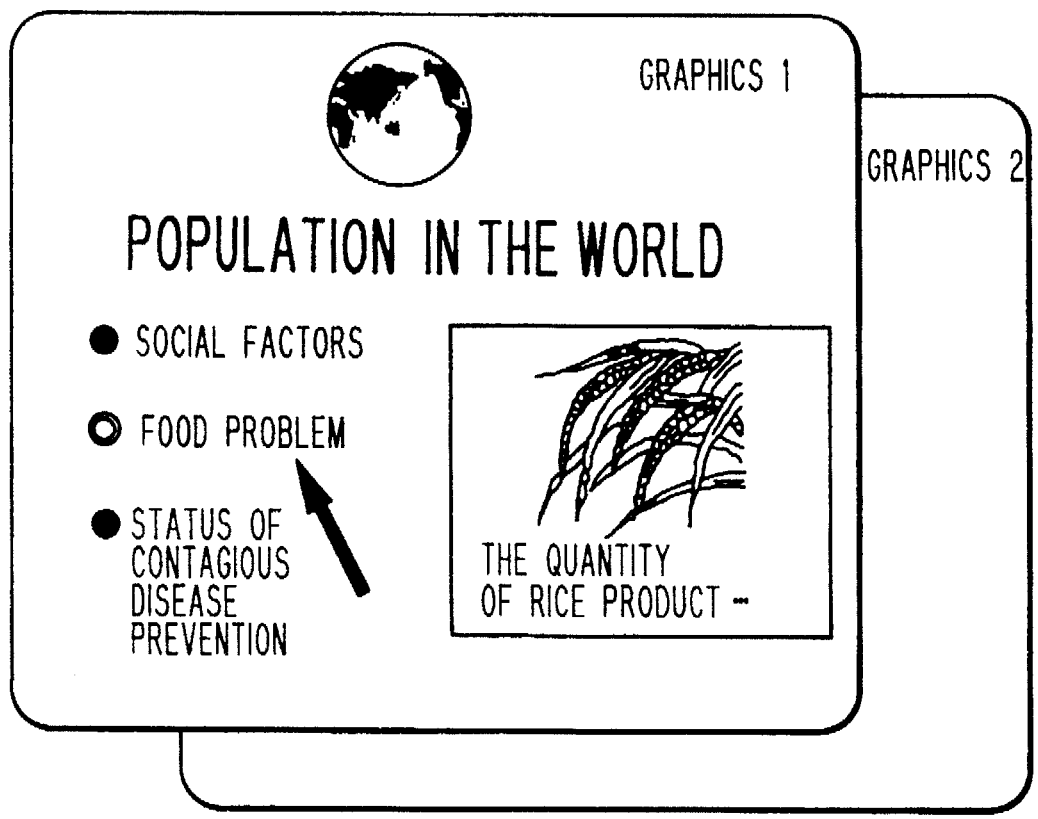

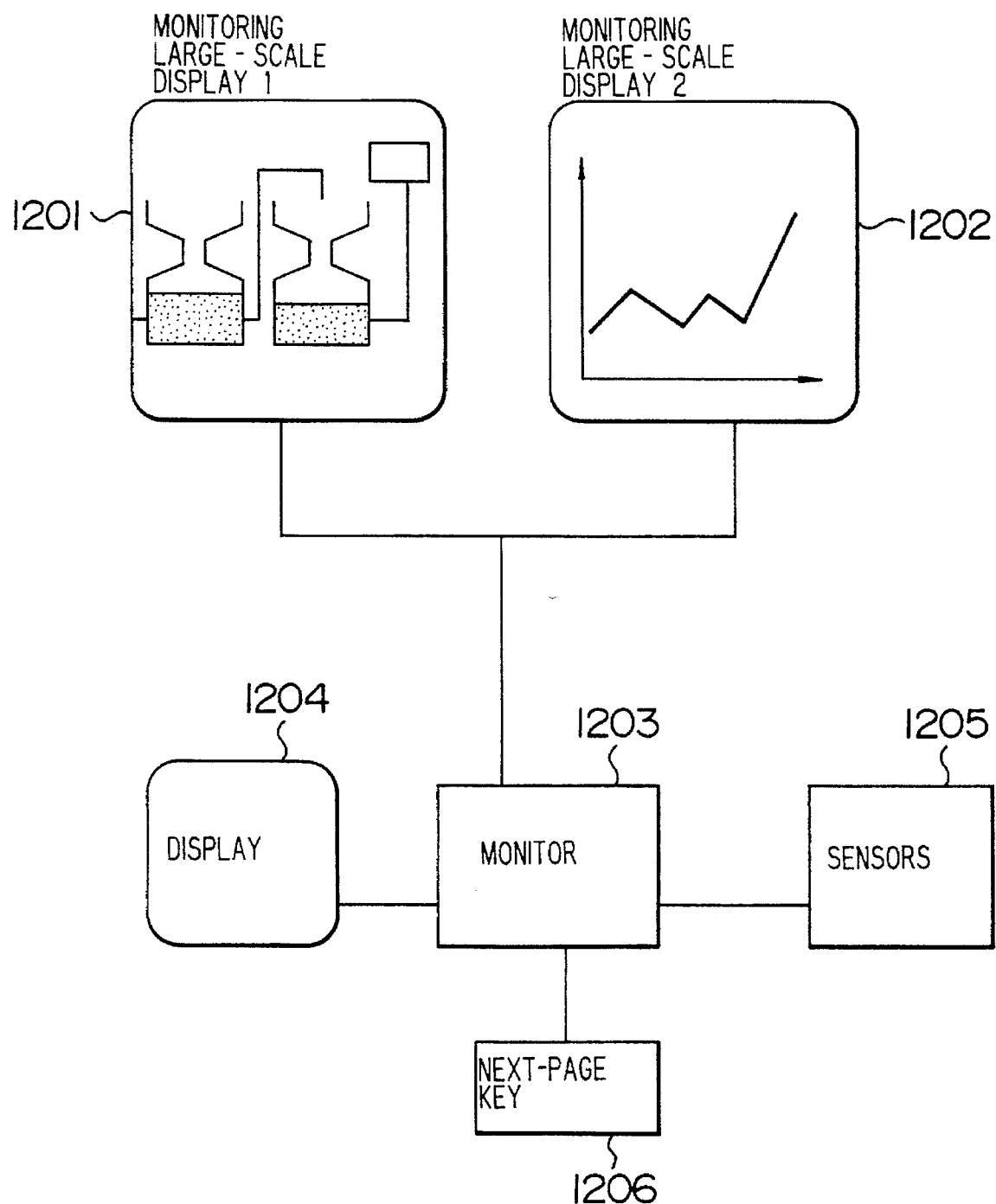
F I G. 18

PRESENTATION SUPPORTING METHOD AND APPARATUS THEREFOR

This application is a continuation of Ser. No. 07/709,976, filed Jun. 4, 1991, now abandoned.

BACKGROUND OF THE INVENTION

The present invention relates to a presentation system for performing presentation while displaying presentation information generated by a data processor on an audience-site large-scale screen. In particular, it relates to a presentation supporting method in which the progress of presentation (i.e., presentation program) is smoothened with use of a plurality of screens and with lightening the load imposed on a presenter, and an apparatus therefor.

Heretofore, in the case of presentation in the place of various meetings such as a meeting of an academic society, slides or OHP sheets have been turned in order. In recent years, this type presentation system has been developed so that the presenter performs presentation by displaying presentation information generated by a data processor on a large-scale screen.

As conventional presentation systems, there are those disclosed in Japanese Patent Unexamined Publication Nos. JP-A-63-204315 and JP-A-64-70823.

In the aforementioned prior art, information given from the coordinates input panel is merely superimposed on information generated by a data processor after the information generated by a data processor is directly displayed on the large-scale screen. In short, information having the same contents is displayed on both the presenter-site screen seen by the presenter and the audience-site screen.

In the case of presentation by using slides or the like, the presenter writes supplementary explanation for the presented contents, order of points to be indicated, etc. on memos and makes presentation by reference to the memos at the time of presentation. In the conventional presentation system in which presentation information generated by a data processor is displayed on the large-scale screen, there is no consideration about the memos necessary for this presentation. Accordingly, the memos must be produced individually even in the case where the presentation is made by using an expensive apparatus. That is, in the conventional presentation system, if memo information is generated by a data processor, the memo information is merely displayed on the audience-site screen. Accordingly, memo paper must be prepared separately from the memo information.

In the case where presentation information is displayed on the audience-site screen, conventionally, all display data on the presenter-site screen are also displayed on the audience-site screen. Accordingly, the command selection icon such as screen scroll, etc. displayed on the presenter-site screen is also displayed on the audience-site screen. There arises a problem in that the audience-site screen is not easy to see.

Further, when characters are displayed by using an outline font or the like to make the display of the audience-site screen good, the quantity of information is increased. Even if the presenter makes an operation by using a data processor to promote the progress of presentation and promote questions and answers, response becomes bad because the large quantity of information must be processed by the data processor. There arises a problem in that the progress of presentation cannot be smoothened.

In Japanese Patent Unexamined Publication No. JP-A-63-10227, on the other hand, disclosed is a system in which screen assignment information (destination address, picture updating command) for a plurality of displays is inserted in advance in presentation information so that different images can be displayed simultaneously on a plurality of displays connected to one transmission line group.

In this conventional technique, however, a decoder and a picture memory are provided in each of the display devices. A one-field's or one-frame's picture is displayed by giving a refresh command to one picture memory by decoding the destination address and the picture updating command inserted in an application program of a computer by the respective decoders. Accordingly, the destination and the picture updating timing are defined in the application program in advance. It is difficult that the presenter or the like directly assigns scenes to the display devices in order.

In the presentation system or the like, use of a plurality of display devices is effective for performing presentation smoothly. In this case, a function for automatically displaying presentation information on a most desired display device selected from the plurality of display devices without any special designation by the presenter is preferred for the purpose of successively displaying presentation information on the display devices.

In the conventional technique, however, there is no means of performing presentation by using a large number of screens easily. Furthermore, in the conventional technique, there is also no means of automatically smoothening the progress of presentation without the presenter's designating one from the plurality of display means.

In addition, in the case where a display means can be selected automatically to perform display, the function must cope with complicated presentation form as well as simple presentation form.

SUMMARY OF THE INVENTION

An object of the present invention is therefore to provide a presentation supporting method in which when a presenter performs presentation, displays to be easily seen by audience can be provided without necessity of preparing memos specially, and an apparatus therefor.

Another object of the present invention is to provide a presentation supporting method in which the speed of processing for generating presentation information is not reduced even if the presenter uses private supporting information when the presenter makes presentation, and an apparatus therefor.

A further object of the present invention is to provide a screen assignment system, a screen assignment method and a presentation system in which presentation information can be automatically assigned to any one of a plurality of screens when the presenter makes presentation by using the plurality of screens.

According to a first aspect of the present invention, when presentation is performed while presentation information is displayed on both the presenter-site screen and the audience-site screen, only the presentation information, among the presentation information displayed on the presenter-site screen and the additional information used by the presenter, is displayed on the audience-site screen.

According to a second aspect of the present invention, when presentation information is displayed on both the audience-site screen and the presenter-site screen provided separately from each other, the drawing information displayed on the audience-site screen is converted into abridged data to thereby display the abridged data on the presenter-site screen.

In the aforementioned configuration of the present invention, the information to be displayed for the audience and the additional information to be displayed only for the presenter are distinguished from each other so that the information to be displayed for the audience is displayed on both the audience-site screen and the presenter-site screen whereas the additional information is displayed only on the presenter-site screen. Accordingly, the audience-site screen is easy to see because there is no unnecessary information. A memo necessary for the progress of presentation is displayed on the presenter-site screen, so that the progress of presentation can be smoothened by reference to the memo.

In the case where the presentation information is displayed on the presenter-site screen, the presentation information to be displayed on the audience-site screen is converted into abridged data and then processed by a data processor for performing display control on the presenter-site screen. Accordingly, the quantity of information processed by the data processor is so reduced that the presentation control can be made with good response. Further, beautiful characters and the like can be displayed on the audience-site screen, so that the audience-site screen is easy to see.

According to a third aspect of the present invention, the system comprises a plurality of display means having screens for displaying presentation information, a display switching means for issuing a command to switch over any one of the display means on the basis of the generation of new presentation information, and a control means having a plurality of assignment deciding functions for assigning the display of presentation information to any one of the display means on the basis of the command, so that a display means for displaying the next presentation information is decided on the basis of designation by the assignment deciding functions when the display switching means perceives the next presentation information.

There are various kinds of the assignment deciding functions by replacing the screen being longest in the display time, the screen being shortest in the display time, the preliminarily designated screen, etc. to decide the display means for displaying the next presentation information.

Further, a presentation system for automatically deciding the destination of the next presentation information is provided.

In the aforementioned configuration of the present invention, when the display of the next presentation information is perceived correspondingly to the display switching means, the destination is automatically assigned according to the assignment deciding functions. In detail, the destination is decided by using the assignment deciding functions or computer programs in the complicated case. In general, various kinds of assignment deciding functions are prepared. An assignment deciding function is selected before display/presentation.

At the time of display/presentation, the presenter, watchman or the like requests the display of the next information by using a switch as a key. The display switching means perceives this and transmits the display of the next presentation information to the control means. The control means decides a corresponding display means from the plurality of display means automatically on the basis of the assignment deciding function selected in advance. Thereafter, the presentation information to be displayed next is sent to the display means thus decided, so that the presentation information is displayed.

In the case where a display switching means for designating the destination directly is used and when the presenter requests the next presentation information by using a switch, the display switching means transmits the request for the display of the next presentation information to the control means and at the same time performs designation of the display means. The control means sends the presentation information to be displayed next to the designated display means, so that the presentation information is displayed.

BRIEF DESCRIPTION OF THE DRAWINGS

FIGS. 2A and 2B are explanatory views showing the presenter-site display, the audience-site display and the form of presentation information stored in the presentation information storage section;

FIG. 5 is a block diagram of a presentation supporting apparatus having a plurality of audience-site screens as a third embodiment of the present invention;

FIG. 12 is an explanatory view showing an example in which computer programs as an assignment deciding function are added to presentation information;

FIG. 14 is an explanatory view showing the example of the presenter-site screen in which the display means is not assigned simply;

FIG. 18 is an explanatory view showing a screen assignment system in process control.

DESCRIPTION OF THE PREFERRED EMBODIMENTS

The present invention will be described below with reference to the drawings.

Figure 1:
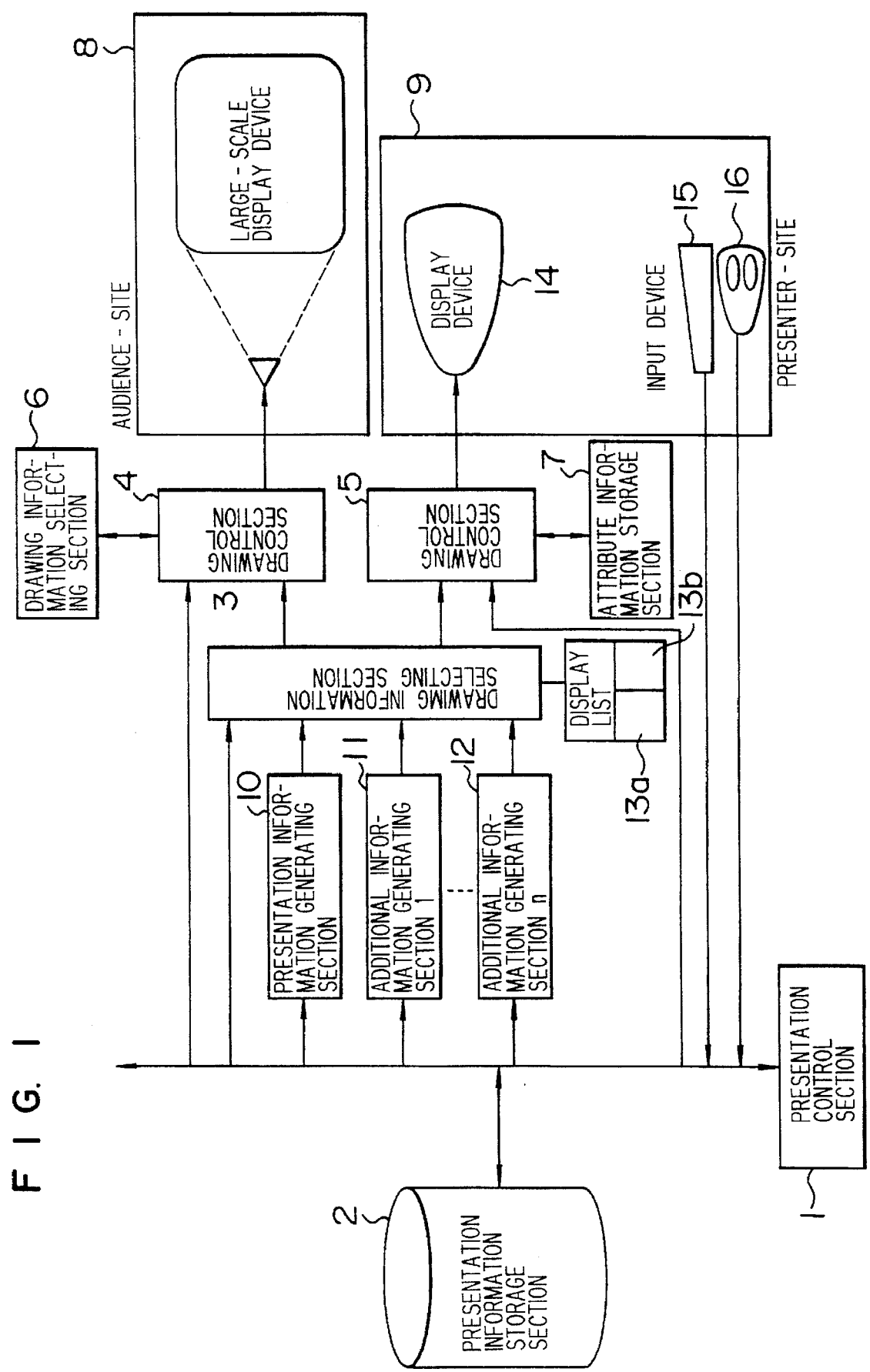
FIG. 1 is a block diagram of a presentation supporting apparatus as a first embodiment of the present invention.

FIG. 1 is a diagram of a presentation supporting apparatus according to a first embodiment of the present invention. The presentation supporting apparatus has a display device 14 in a presenter-site unit 9, an audience-site display device 8, drawing control sections 4 and 5 for generating presentation information and additional information (which will be described later) to be displayed on the display devices 8 and 14, a drawing information selecting section 3 used as an information display selection unit for selecting a drawing control section to which presentation information is to be transferred, a presentation information generating section 10 used as an information generating unit for generating presentation information from data read from a storage device (which will be described later), additional information generating sections 11 and 12 used as other information generating units for generating additional information such as guidance information written on memos by the presenter, timer information representing the passage of presentation time, etc. from data read from the storage device, a presentation storage section 2 for storing data for generating presentation information and additional information, an input device such as a keyboard 15, a mouse 16, etc. to which a command for controlling the progress of presentation is given by the presenter and which is used as an input section of an input control unit, and a presentation control section 1 used as an input control unit for generally controlling the presentation supporting apparatus. The additional information also serves as supporting information for supporting the progress of presentation to be made by the presenter.

The drawing information selecting section 3 includes display lists 13a and 13b for storing names of the information generating sections 10, 11 and 12 for generating presentation information to be displayed on the audience-site and presenter-site display devices 8 and 14. The drawing control section 4 has an attribute information storage section 6 for storing drawing attributes such as window size, etc. corresponding to the names of the information generating sections 10, 11 and 12 which are sent thereto.

In the following, a flow of presentation control processing is described. When a command to display presentation information is given from the presenter-site input device 15 or 16, the presentation control section 1 first makes initialization for displaying presentation information. Therefore, the presentation control section 1 gives instructions to the presentation information generating section 10 to prepare for the starting thereof to receive presentation information from the presentation information storage section 2. In the case where information to be displayed is presentation information, the presentation control section 1 gives instructions to the drawing information selecting section 3 to send information from the presentation information generating section 10 to the audience-site and presenter-site drawing control sections 4 and 5. On the basis of the display selecting command, the drawing information selecting section 3 writes the name of the presentation information generating section 10 in the audience-site and presenter-site display lists 13a and 13b and makes preparation for sending presentation information from the presentation information generating section 10 to the audience-site and presenter-site drawing control sections 4 and 5. Further, the presentation control section 1 determines drawing attributes, such as display position, display size, etc., of presentation information given from the presentation information generating section 10, for the audience-site and presenter-site drawing control sections 4 and 5. On the basis of the drawing attribute command, the drawing control sections 4 and 5 store the attribute information in the attribute information storage sections 6 and 7 provided for the presentation information generating section 10.

After initialization for display, the presentation control section 1 makes the presentation information generating section 10 start. The presentation information generating section 10 reads presentation information from the presentation information storage section 2 and transfers it to the drawing information selecting section 3. The drawing information selecting section 3 sends the presentation information to the respective drawing control sections 4 and 5 on the basis of the display lists 13a and 13b. The respective drawing control sections 4 and 5 perform drawing on the basis of the attribute information stored in the attribute information storage sections 6 and 7 correspondingly to the presentation information, so that the presentation information is displayed on the respective display devices 8 and 14. By the aforementioned operation, the presentation information designated by the presenter is respectively displayed on the audience-site and presenter-site display devices 8 and 14 with predetermined sizes.

In the case where additional information is displayed only on the presenter-site display device 14, the presentation system operates as follows. When a command to display additional information such as guidance, etc. is given by the presenter through the input device 15 or 16, the presentation control section 1 performs initialization for display in the same manner as in the case of display of presentation information. The presentation control section 1 reads data from the storage section 2, secures the area and clears the memory to make preparation to generate additional information in the additional information generating section 11. Then, the presentation control section 1 issues a display selection command to the drawing information selecting section 3 to display the additional information of the additional information generating section 11 only on the presenter-site display device 14. As a result, the name of the additional information generating section 11 is stored in the presenter-site display list 13b in the drawing information selecting section 3 but it is not stored in the audience-site display list 13a. As a result, the additional information of the additional information generating section 11 is transferred only to the presenter-site drawing control section 5. Then, the presentation control section 1 gives designation of drawing attributes to the presenter-site drawing selecting section 3.

After the aforementioned initialization is finished, the presentation control section 1 makes the additional information generating section 11 start. The additional information generating section 11 reads data for designated additional information such as guidance, etc. from the presentation information storage section 2 and converts the data into additional information to be transferred to the drawing information selecting section 3. Although the drawing information selecting section 3 transfers the presentation information to the next, respective drawing control sections 4 and 5 on the basis of the display lists 13a and 13b, the drawing information selecting section 3 transfers display data only to the presenter-site drawing control section in the case of additional information because the name of the additional information generating section 11 exists only in the presenter-site display list 13b. As a result, the additional information can be displayed only on the presenter-site display device 14. That is, presenter's private information such as guidance, etc. can be displayed on the presenter-site display device 14 without audience's seeing the information. The additional information used herein includes presentation tools such as guidance, timer, etc. and presentation system operating circumstances such as information pertaining to presentation contents, command menu, etc. As a result, unnecessary information except for the presentation information is not displayed on the audience-site display device 8, so that a display screen being easily seen by the audience can be generated.

Figure 2A:
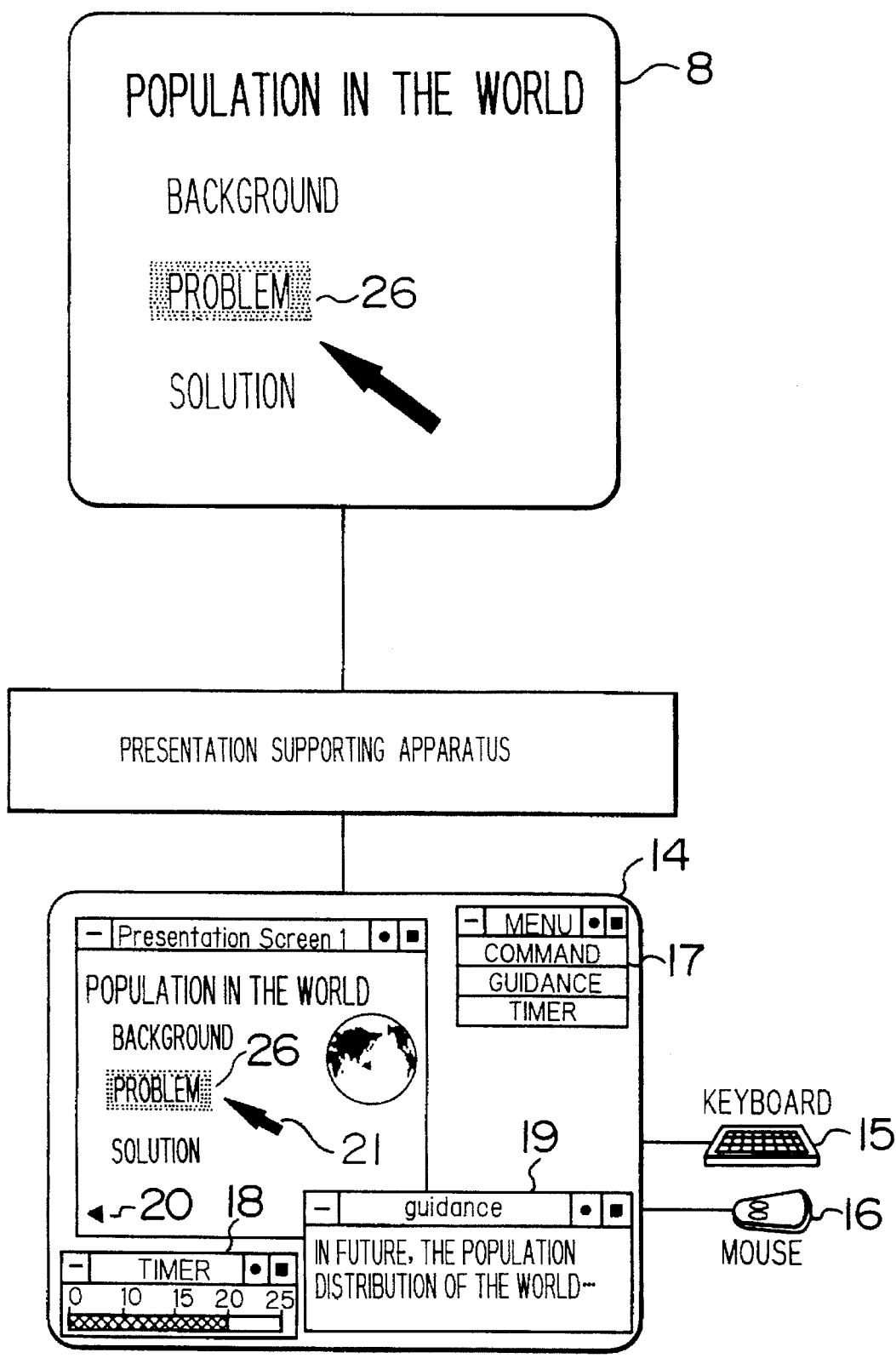

FIG. 2A shows an example of display in the presentation supporting apparatus depicted in FIG. 1. In this presentation supporting apparatus, the presenter performs the progress and control of presentation by using a presenter-site display device 14 and an input device such as a keyboard 15, a mouse 16, or the like. On the other hand, the audience understands the presentation by seeing a large-scale display device 8 different from the presenter-site display device. Presentation tools such as a command menu 17, a timer 18, a guidance 19, a new page button 20, etc. as well as the presentation information displayed on the audience side are displayed on the presenter-site display screen 14. Nothing but the presentation information is displayed on the audience-site display screen 8. That is, additional information such as various kinds of windows, frames, a guidance 19, a command menu 17, etc. required for controlling the presentation is not displayed on the audience-site display screen 8.

In this presentation system, the presenter performs controlling by using the mouse 16 mainly. A mouse cursor 21 moved through the mouse 16 is displayed on the presenter-site display screen 14. The presenter can give the operation defined by a display image to the presentation control section 1 by moving the mouse cursor 21 and picking it at the display image. In this system, the mechanism is attained by the following method.

As shown in FIG. 2B, data such as display contents 22, a display area 23 and operations 24 and 25 corresponding to input events (picking of the mouse, etc.) which occur in the display area are stored in the presentation information storage section 2. In this embodiment, the data are called "graphic objects". When the presenter picks the left button of the mouse 16, "left mouse pick" as an event generated from the mouse 16 and the position where the event occurs are sent to the presentation control section 1. When the input event is given from the mouse 16, the presentation control section 1 inquires of the respective information generating sections 10, 11 and 12 as to whether a graphic object having operation definition with respect to the event exists at the position where the input event occurs, among the currently displayed data. If a graphic object exists, the presentation control section 1 interprets the operation and instructs the respective information generating section 10, 11 and 12 to carry out the operation. For example, a display area 23 and operations 24 and 25 as shown in FIG. 2B, as well as the display information 22, are defined in the graphic object "problem" 26 in FIG. 2A. When the presenter picks the left button of the mouse 16 on the graphic object, the presentation control section 1 knows that the graphic object "problem" 26 having a defined operation corresponding to the event exists in the presentation information generating section 10. Then, the presentation control section 1 instructs the presentation information generating section 10 to carry out the designated operation 24. As a result, the graphic object "problem" 26 begins to blink on both the presenter-site display screen 14 and the audience-site large-scale screen 8. Accordingly, this system attains an effect necessary for the presentation. Further, in this system, a command menu 17, a presentation control button 20 such as a new page button, etc. are attained by combination of graphic objects as described above.

Figures 3A, 3B:
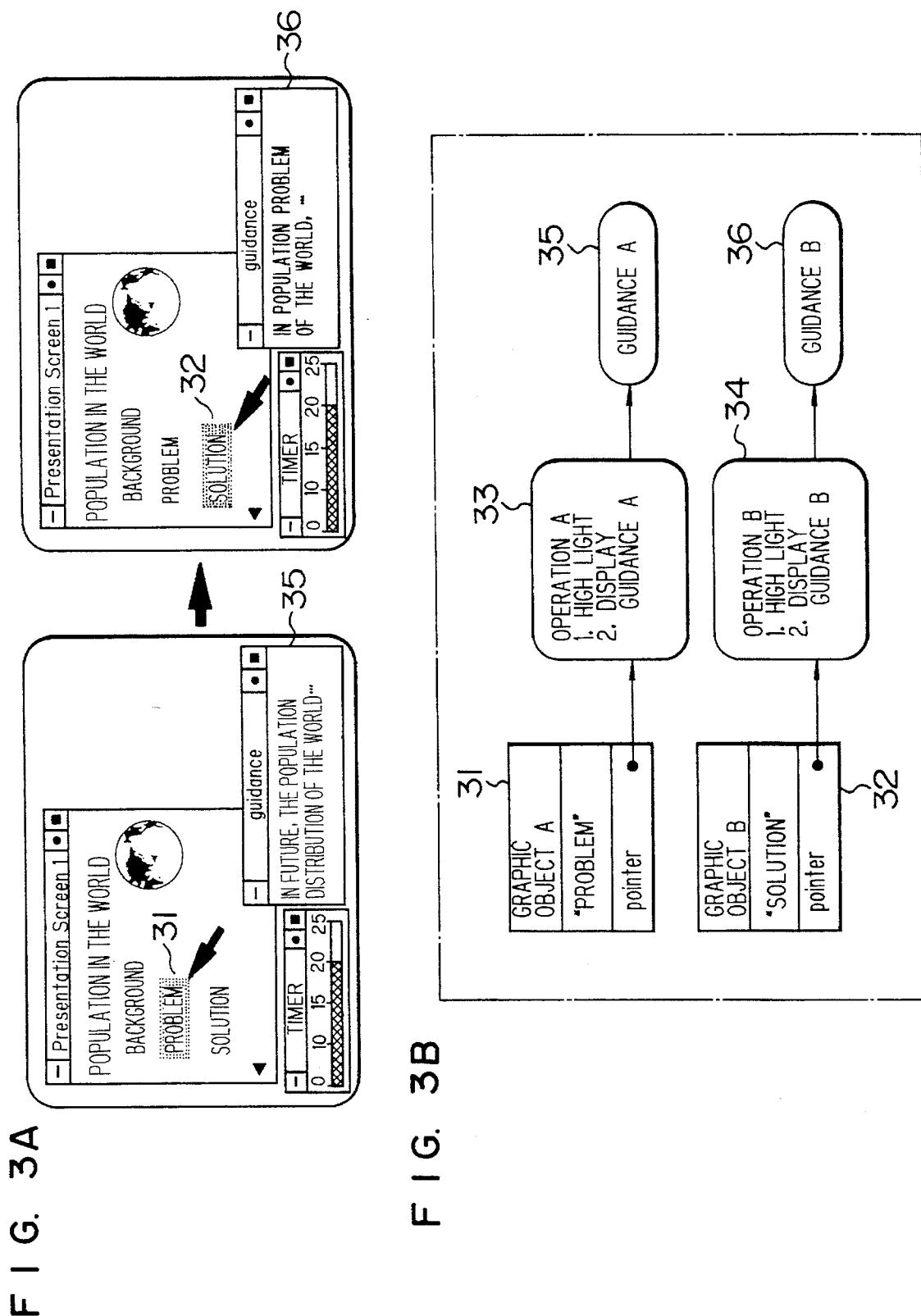
FIGS. 3A and 3B are explanatory views showing the cooperative relation between presentation information and additional information.

In this embodiment, a cooperative function between the progress of the presentation (i.e., presentation program) and additional information is attained by using the function of the graphic objects. That is, as shown in FIGS. 3A and 3B, the graphic object A "problem" 31 is related to the operation A (33) which is defined as "an operation of highlighting the graphic and updating the guidance to guidance A (35) when the left button is picked". On the other hand, the graphic object B "solution" 32 is related to the operation B (34) which is defined as "an operation of highlighting the graphic and updating the guidance to guidance B (36) when the left button is picked".

After the aforementioned operation definition is made in advance, the presenter picks up the graphic object "problem" 31 according to the presentation to carry out the presentation. Then, the presentation control section 1 interprets the operation of the graphic object "problem" 31, instructs the presentation information generating section 10 to highlight the graphic object and then instructs the additional information generating section 11 (guidance information generating section) to update the guidance to guidance A (35). When the presentation further progresses and the presenter picks up the graphic object "solution" 32, the presentation control section 1 instructs the presentation information generating section 10 to highlight the graphic and then instructs the additional information generating section 11 to update the guidance to guidance B (36), according to the operation B related to the graphic object. As described above, through the cooperative function in this system, the additional information (guidance) can be cooperatively updated by picking necessary positions with the progress of the presentation.

In general, in the presentation system, beautiful display is necessary for the audience-site display device. However, in most cases, display on the presenter-site display device may be abridged as long as the presenter can understand the displayed information. By providing such display devices, a high-speed and efficient presentation system in which unnecessary processing is removed can be formed.

Figure 4:
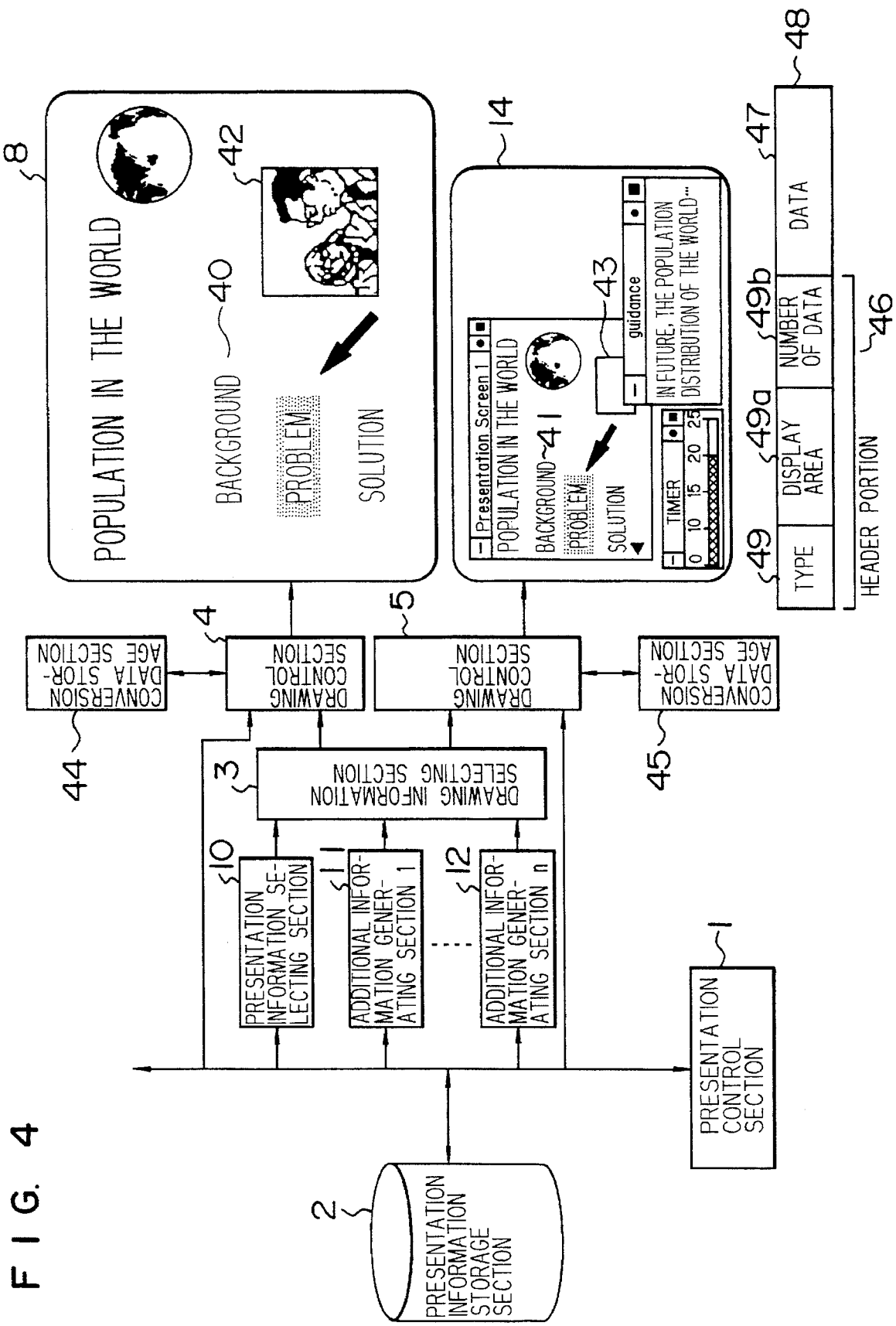
FIG. 4 is a block diagram of a presentation supporting apparatus in which abridged presentation information is displayed on the presenter-site screen, as a second embodiment of the present invention.

In the following, a presentation system for performing abridged display, as a second embodiment of the present invention, is described with reference to FIG. 4. In FIG. 4, outline font 40 for beautiful display is used for displaying characters on the audience-site display device 8, whereas dot font 41 for high-speed display is used for displaying characters on the presenter-site display device 14. When animation is used for presentation, nothing but the frame 43 of animation is displayed on the presenter-site display device though animation 42 is displayed on the audience-site display device. A system for attaining abridged display is described in detail by using the two examples.

In this embodiment, a conversion data storage section 44 is provided in the drawing control section 4 correspondingly to the respective information generating sections 10, 11 and 12. After the presentation information is converted by using conversion data stored in the conversion data storage section 44, the drawing control section 4 performs drawing to thereby perform display suitable for the respective display devices 8 and 14. In this embodiment, the presentation control section 1 initializes drawing attributes for the respective drawing control sections in the same manner as described above before the presentation information is displayed. Simultaneously with the initialization, data are set in the conversion data storage sections 44 and 45.

An example of the data setting is shown in FIG. 4. It is now assumed that character data are converted as follows. The conversion data storage section 44 in the audience-site drawing control section 4 is set to be instructed to convert the character attribute "Gothic" into "outline font Gothic". The conversion data storage section 45 in the presenter-site drawing control section 5 is set to be instructed to convert the character attribute "Gothic" into "dot font Gothic". When data to display "Gothic" characters are sent from the presentation information generating section 10 to the respective drawing control sections 4 and 5, the audience-site drawing control section 4 converts the character attribute "Gothic" into "outline font Gothic" by reference to the conversion data storage section 44 corresponding to the presentation information generating section 10 to thereby perform beautiful display 40 in outline font. On the other hand, with respect to the presenter-site display device 14, when the same data to display Gothic characters are given, the character attribute "Gothic" is converted into "dot font Gothic" by reference to the conversion data storage section 45 corresponding to the presentation information generating section 10 to thereby perform high-speed display in dot font 41. Accordingly, presenter-site display can be simplified compared with audience-site display, so that a presentation system being high in processing speed can be provided.

In the case of animation display, presenter-site one 45 of the conversion data storage sections 44 and 45 is instructed to "neglect animation data". In this presentation system, graphic data have a data structure 48 separated into two portions, namely, a header portion 46 and a data portion 47. In particular, in the case of animation data, the header portion 46 is composed of animation type 49, animation area 49a on the display screen, and the number of data 49b. The presenter-site drawing control section 5 performs drawing by reference to the attribute information and conversion data while interpreting the display information obtained from the presentation information generating section 10. In the case where the information is of an animation type, from the conversion data of the conversion data storage section 45, the presentation control section 5 knows that animation in the display data string is neglected. The presenter-site drawing control section 5 displays a rectangular frame 43 as the animation area by reference to the display area 49a of the header portion 46 of the animation information to tell the presence of the animation area to the presenter. Then, the presenter-site drawing control section 5 neglects a predetermined number of posterior data by reference to the number of data 49b of the animation information. As a result, the frame 43 of animation is merely displayed on the presenter-site display device while the animation is displayed on the audience-site display device 8. Accordingly, the heavy processing of animation display can be removed from the presenter-site display device 14, so that an efficient presentation system can be provided.

In the following, a presentation system capable of controlling a plurality of audience-site display screens is described. FIG. 5 is a diagram showing a third embodiment of the present invention. This embodiment is formed by extending the single audience-site screen presentation system as the first embodiment to be applied to a plurality of audience-site display devices. That is, this embodiment is formed by replacing the audience-site drawing control section and the presentation information generating section in the first embodiment by drawing control sections 50 and 51 and presentation information generating sections 52 and 53 corresponding to the respective screens. Further, a presentation information control section 54 for generally controlling the presentation information generating sections 52 and 53 is added thereto.

In this embodiment, the number of audience-site screens may be designated through an input device such as a keyboard 15 by the presenter in advance or may be known by hardware examination. As a result, the presentation system starts the presentation information generating sections 52 and 53 and the drawing control sections 50 and 51 corresponding to the number of screens. Entry 55 for selecting an audience-site screen for displaying presentation data is newly added, as multi-screen presentation data, to the conventional presentation data. When the system is started, the presentation control section 1 operates the presentation information control section 54 to instruct it to display the presentation information. The presentation information control section 54 reads data for the presentation information from the presentation information storage section 2, examines the audience-site display device entry 55 from the data, selects a screen to be used for display from the audience-site screens 56 and 57, and transfers the presentation information to one of the presentation information generating sections 52 and 53 correspondingly to the selected audience-site screen 56 or 57. The presentation information generating section 10 which has received the presentation information transfers data to the drawing information selecting section 3 in the same manner as in the first embodiment to thereby display the data on both the screen of corresponding one of the audience-site display device 56 and 57 and the screen of the presenter-site display device 14. An example of the display is shown in FIG. 6.

Figure 6:
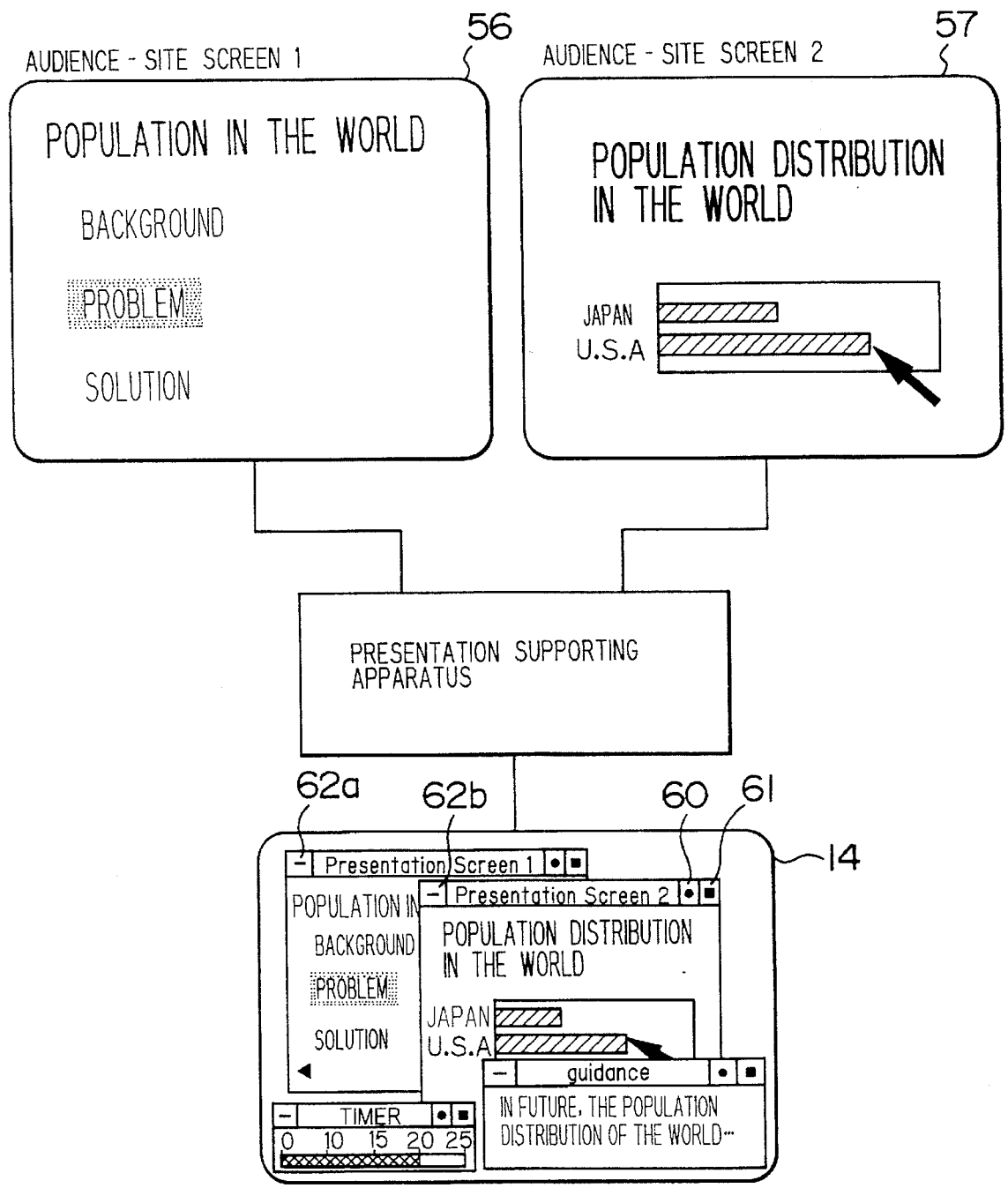
FIG. 6 is an explanatory view showing the plurality of audience-site screens and the presenter-site screen.

FIG. 6 shows a system using two audience-site display devices 56 and 57. In respect to the audience-site display devices 56 and 57, the display contents are displayed respectively on the display devices designated by the presentation information. In respect to the presenter-site display device 14, the presentation information displayed on the two audience-site display devices is displayed in windows corresponding to the audience-site display devices. Not only window functions such as "close" 60, "front-most display" 61, etc. are provided but explanation indicator portions 62a and 62b for indicating currently explained presentation information among the displayed presentation information are provided to the windows. In the case where the explanation indicator portion is not effective, it is displayed as shown in the reference numeral 62a in FIG. 6. In the case where the explanation indicator portion is effective, it is displayed as shown in the reference numeral 62b in FIG. 6. The presenter can know the currently effective screen by glancing at the explanation indicator portion.

As described above, the presenter can control presentation by operating the presenter-site display device or processor. Further, private information required for presentation can be displayed only on the presenter-site screen. Further, abridged data can be displayed on the presenter-site screen. Accordingly, the audience can receive presentation while seeing screens easily. In addition, the presentation can be controlled effectively.

Figure 7:
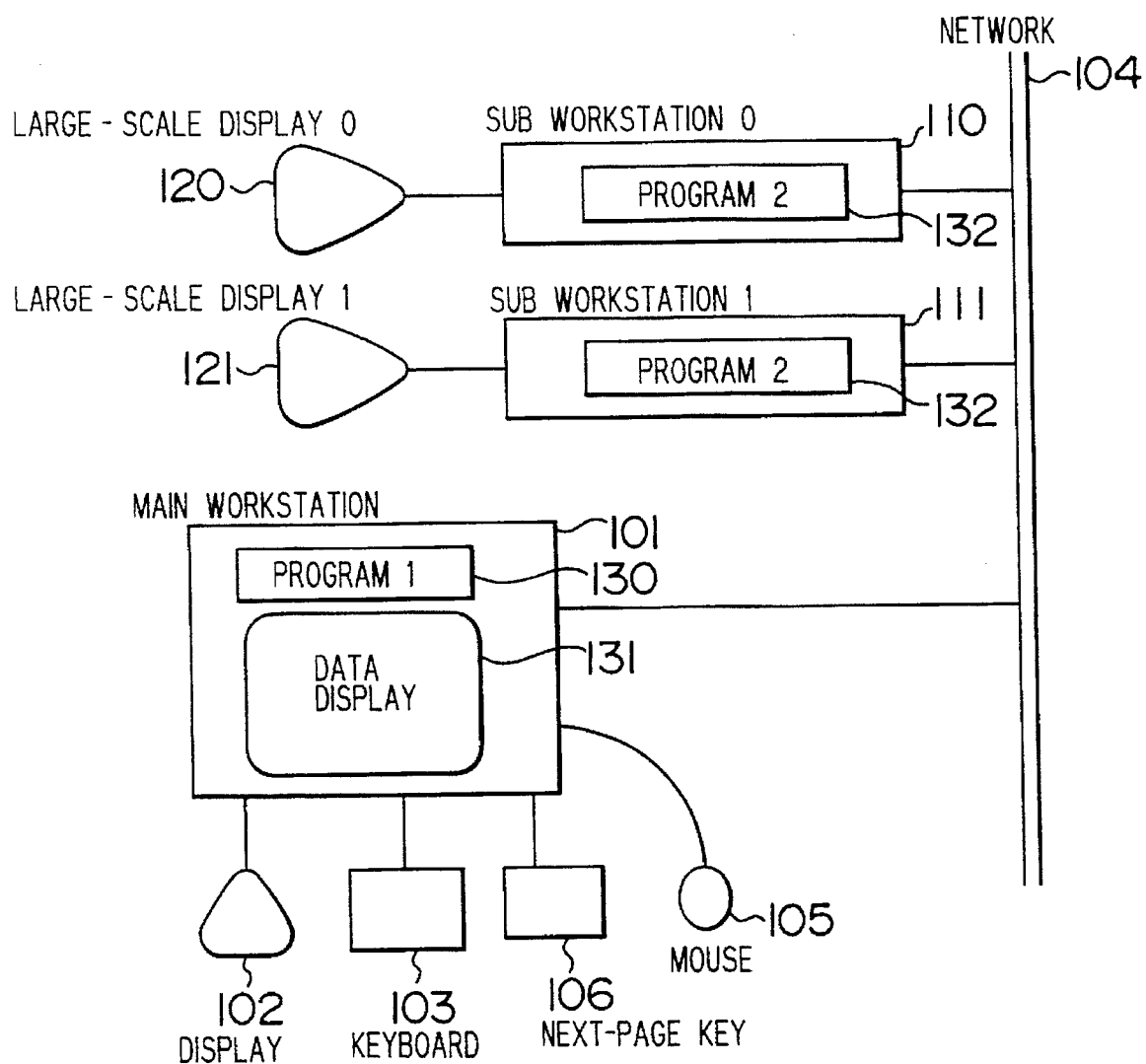
FIG. 7 is a block diagram of a presentation supporting apparatus as a fourth embodiment of the present invention.

FIG. 7 shows a presentation supporting system as a fourth embodiment of the present invention.

In FIG. 7, the reference numeral 101 designates a main workstation for displaying high-precision graphics, as a body of a presentation system. The reference numerals 110 and 111 designate subsidiary workstations. The reference numeral 104 designates a network for connecting the subsidiary workstations 110 and 111 to the main workstation 101. The subsidiary workstations 110 and 111 are provided with identification numbers respectively by which they can be discriminated from each other. Although the number of the subsidiary workstations are not limited, an example of use of two subsidiary workstations is described herein. The reference numerals 120 and 121 designate large-scale displays used as display means connected to the subsidiary workstations 110 and 111, respectively. The reference numeral 102 designates a display used for checking display data and for performing various kinds of manipulations. The reference numeral 105 designates a mouse through which the presenter determines a graphic. The reference numeral 103 designates a keyboard for setting an assignment deciding function. The reference numeral 106 designates a next page key through which the presenter as a system user determines the timing of turning over the pages of graphics. All the display 102, the keyboard 103, the next page key 106 and the mouse 105 are connected to the main workstation 101. These means are not always necessary. That is, other means may be used as long as the same function can be attained. Though not shown, display data hold means for holding display data, for example, storage means such as disk devices, are connected to the inside or outside of the main workstation 101.

The reference numeral 130 designates No. 1 program for controlling the presentation system. The reference numeral 132 designates No. 2 program for controlling display in the subsidiary workstations 110 and 111. The reference numeral 131 designates presentation information. The display data 131 are numbered in the order of pages to be displayed. The presentation information separated into pages is now called "graphics". The graphics include graphic information, character information, picture information, etc.

Figure 8:
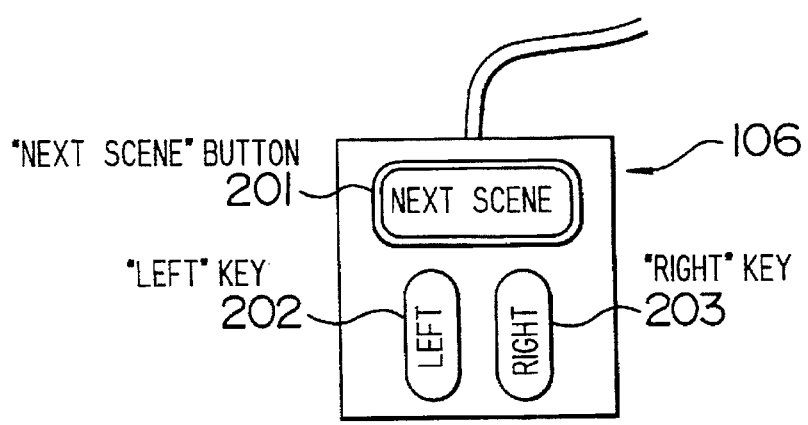
FIG. 8 is a front view showing the next page key.

FIG. 8 shows an example of the next page key 106 used as a scene switching means. In FIG. 8, the reference numeral 201 designates a "next scene" button. When the presenter pushes the key 201, the system automatically carries out an operation of assigning the next scene. In the case where the presenter is to decide manually a scene to be displayed, direct keys can be also used. When, for example, the next scene is to be displayed on the right large-scale screen, the necessary scene can be provided by pushing a "right" key 203. When, for example, the next scene is to be displayed on the left large-scale screen, the necessary scene can be provided by pushing a "left" key 202.

Figure 9:
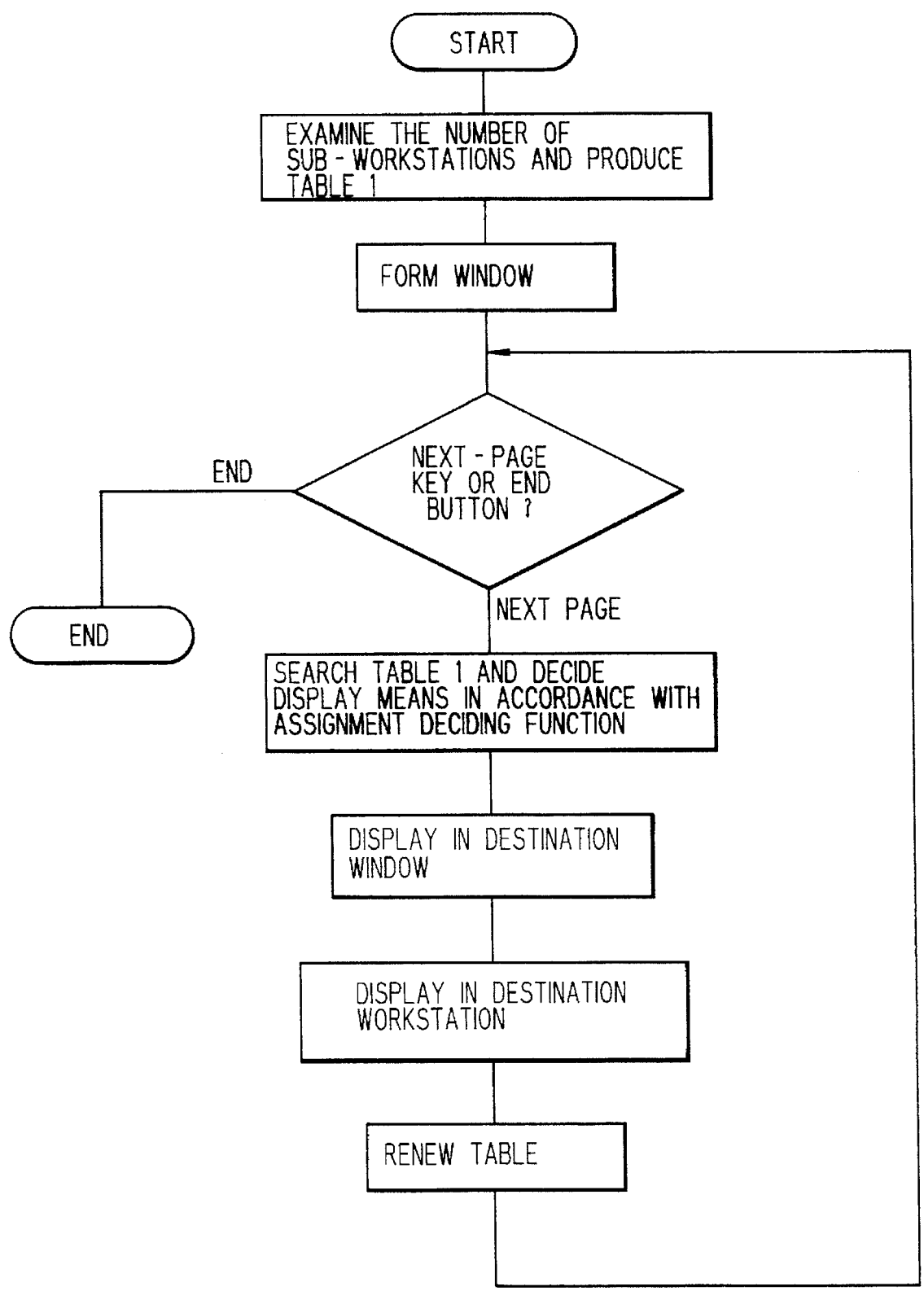
FIG. 9 is a flow chart in the case where the assignment deciding function is carried out.

In the following, an algorithm for the operation of this system is described with reference to FIG. 9.

In this system, a rule for deciding a display means for the next scene, as a method for automatically selecting a display means, is decided before presentation. This rule is now called "assignment deciding function". The assignment deciding function is stored in the main workstation used as a control means. As the assignment deciding function, various means can be considered according to the presenter's preference, the conventional limitation in presentation style, the limitation in hardware, etc. Examples of the assignment deciding function include: a rule in which the longest graphic in display time is preferentially replaced by a new one; a rule in which the graphic is replaced by a new one on the basis of the operating time; a rule in which the first and last important graphics are always displayed on the right side in the case where a large-scale display device is provided on the right side; etc. Of course, a rule in which the presenter determines the graphic assignment sequence for the displays in advance may be considered as a simple example of the assignment deciding function.

In this system, automatic scene assignment at the time of presentation is attained by the presenter's selecting a preferred one from various kinds of assignment deciding functions provided in advance. The following procedure shows the case where a rule in which the longest graphic in display time is replaced to a new one is used as the assignment deciding function in FIG. 9.

(1) When No. 1 program (130) is started, the number of subsidiary workstations 110 and 111 connected is first examined to generate a table having a structure as shown in Table 1. In the table, "index" represents the respective identification numbers for identifying the subsidiary workstations 110 and 111, and "field" represents a point of time at which the current graphic was displayed on the display means. As an initial state of the table, present time is set to the fields of all indexes.

TABLE 1

| Index (subsidiary workstation identification number) | 1 | 2 |
|---|---|---|
| Field (display or operating) | 0 | 0 |

(2) Then, No. 1 program (130) generates two windows on the display 102 of the main workstation 101 correspondingly to the subsidiary workstations 110 and 111. In short, one window corresponds to one subsidiary workstation. When information is displayed on the subsidiary workstations 110 and 111, the same information is displayed in the corresponding windows on the main workstation 101. Each of the windows has the same identification number as the identification number for identifying the corresponding subsidiary workstation 110 or 111.

(3) The presenter performs setting of an assignment deciding function before presentation. The setting is made by selecting a suitable one from the respective numbers given to assignment deciding functions, through the keyboard 103 of the main workstation 101. In the case where nothing is set, a rule in which the longest one in display time is preferentially replaced by a new one is used as a function by default.

It is now assumed that the assignment deciding function by default is used.

(4) In the case where a graphic is to be displayed, the presenter pushes the "next scene" button 201 of the next page key 106 to instruct the No. 1 program (130) to display the graphic.

(5) The No. 1 program (130) finds the index in which the difference between the field value and the present time takes a minimum value, by searching the Table 1 in the ascending order of the index number. Let the index be A. The graphic to be displayed is read from a disk device (not shown) and then written in the window having the identification number A. At the same time, the same graphic is sent to a subsidiary workstation 110 or 111 corresponding to the window.

(6) The No. 2 program (132) receives the graphic and draws the same graphic as drawn in the window of the main workstation 101.

(7) The No. 1 program (130) gives the present time to the field in the table.

(8) A series of operations shown in the paragraphs (4) to (7) is carried out whenever the "next scene" button 201 is pushed by the presenter.

By the aforementioned procedure, display means can be automatically assigned by carrying out the presenter's operation of turning the graphic to a new one.

In the following, means for transferring the currently displayed graphic to another display means on the way of presentation is described with reference to FIGS. 10A and 10B.

Figure 10A:
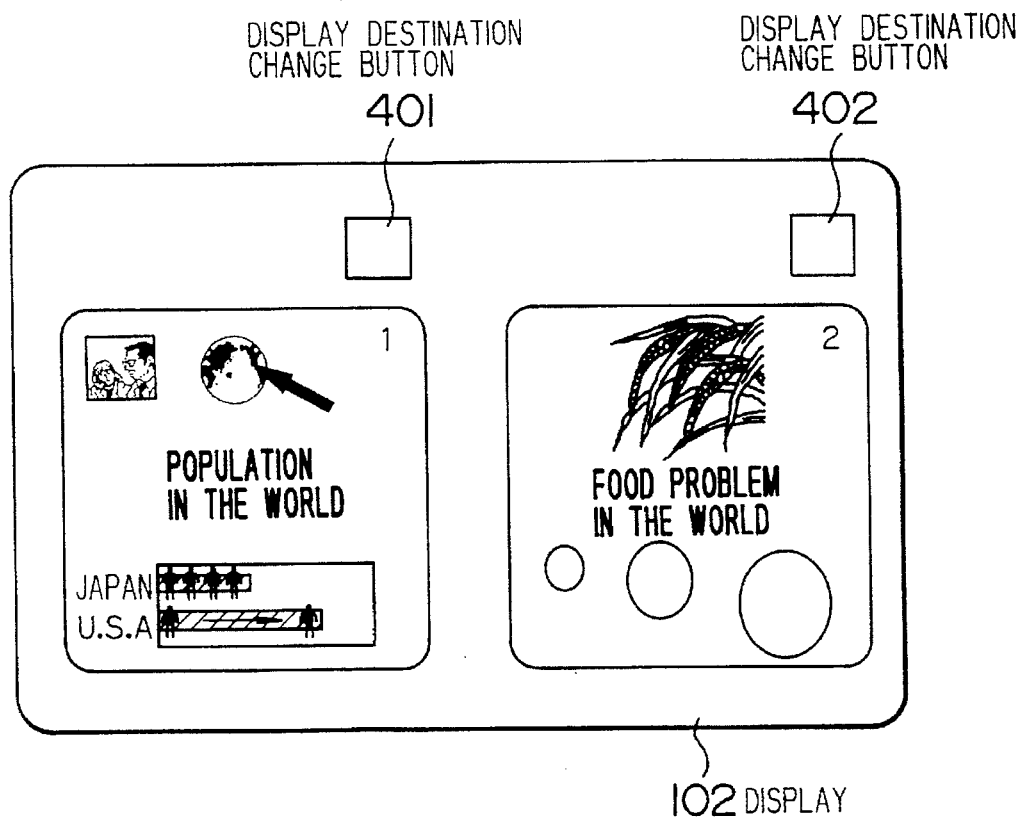
FIGS. 10A and 10B are explanatory views showing the condition in which one of the display means is selected on the screen of the main workstation.

If the presenter does not like the display means by which the graphic is currently displayed, the display means can be changed by clicking, through the mouse 105, display change buttons 401 and 402 provided in the right upper portions of the windows on the multi-window screen as shown in FIG. 10A.

Figure 10B:
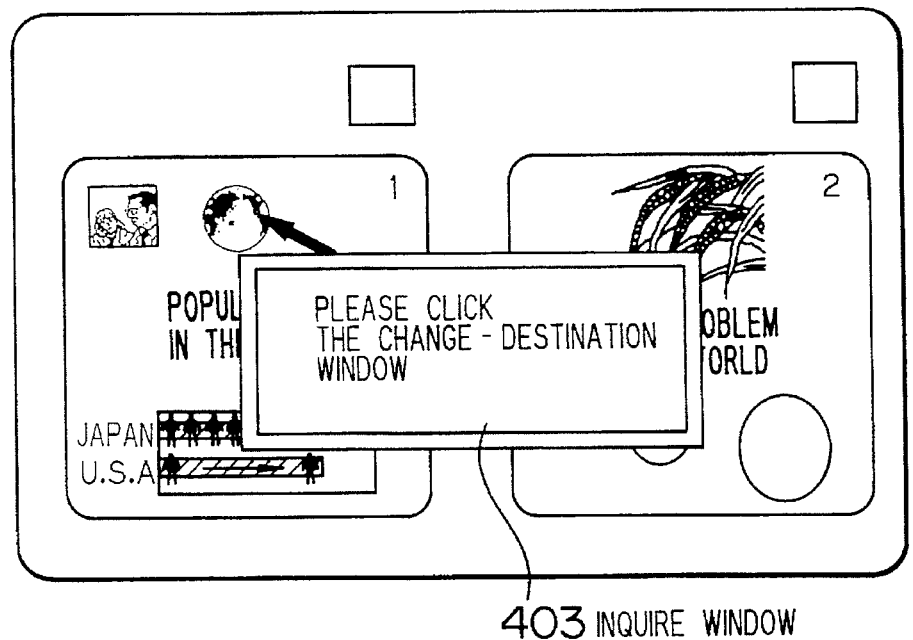

When the buttons 401 and 402 are clicked, a new display means is asked by an inquire window 403 as shown in FIG. 10B. At this time, the graphic can be transferred from the previous window to a new window by clicking the new window directly with use of the mouse 105. At the same time, the graphics displayed on the large-scale displays 120 and 121 are transferred in the same manner as described above. The graphic just prior to the transferred graphic is newly displayed in the previous window.

A mouse cursor specially enlarged to be easily seen by audience, for designating the graphic and for carrying out the operation, is displayed on a large-scale screen corresponding to the window in which the mouse cursor is placed on the main workstation 101.

In the following, a procedure using another assignment deciding function is described with reference to Table 1 and FIG. 9.

A method in which a judgment is made by the operating time instead of the display time as to whether the graphic is replaced by a new one may be used as a function for deciding a destination of display. When, for example, a lot of similar cases are continuously presented, the intention of presentation can be easily notified by leaving cases explained in detail relatively long on a screen compared with cases explained in brief.

A procedure substantially similar to the procedure in the aforementioned function is also applied to this assignment deciding function. However, in the procedure (5) for deciding the next graphic display means, a procedure in which the display means having the smallest field value is decided as the next display means by searching the table in the ascending order of the index number is carried out. Further, the period for explanation of the graphic indicated by the mouse cursor in the display means, instead of the point of time at which the graphic is displayed on the display means, is used as information written in Table 1. As a result, the graphic being shortest in the operating period is preferentially replaced by a new one.

In this function, the graphic explained in detail is left for a long time on the display means, and the graphic of no importance explained in brief is erased rapidly. Accordingly, this function is useful for the case where a lot of cases are presented on a limited number of screens.

As described above, simple and smooth screen assignment can be attained by the presenter's selecting a suitable one from various assignment deciding functions in advance.

In the following, an embodiment using a destination deciding program as an assignment deciding function is described with reference to FIGS. 11 through 15.

For example, in presentation separated into chapters, performed is such a method in which a graphic as a digest of each chapter is displayed at the beginning of the chapter, explanation is continued while the graphic is left as it is, and the graphic is replaced by a new one when the chapter is turned to a new chapter.

The aforementioned assignment deciding function cannot be always used for such purposes. This is because screen assignment cannot be made if information representing the relation between the graphic and the beginning of the chapter is not given. In this case, therefore, employed is a method in which a destination deciding program for deciding a screen for displaying the graphic is set correspondingly to the graphic in advance.

Figure 11:
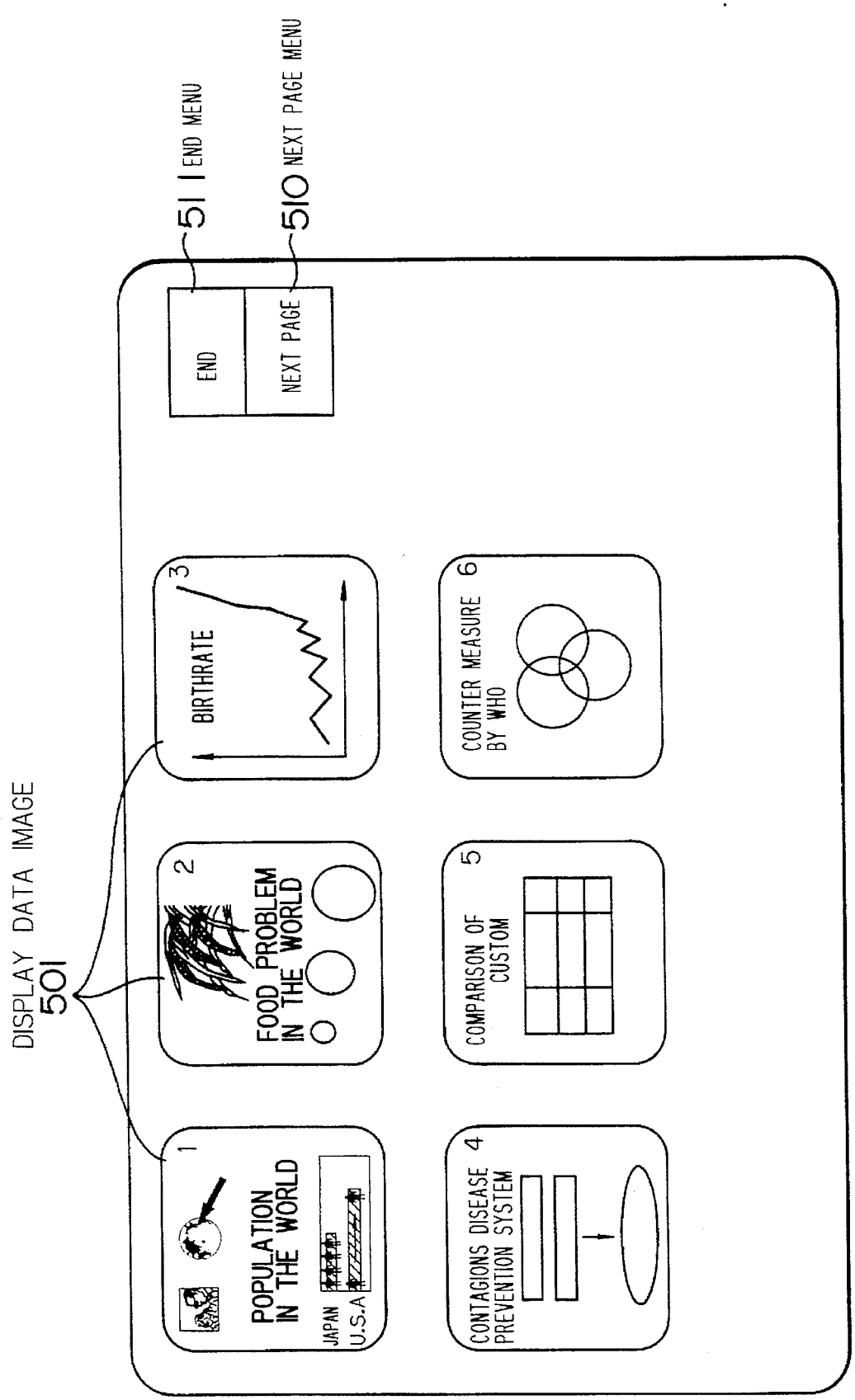
FIG. 11 is an explanatory view showing manipulation on the presenter-site screen to change presentation information displayed on the screen of a display means.

FIG. 11 shows an operational screen of an editor for setting a destination deciding program correspondingly to the graphic. In FIG. 11, the reference numeral 501 designates a scale-down image of each graphic as presentation information. The reference numeral 510 designates a next page menu. When all display data images cannot be displayed on one screen, display data images to be continued can be seen by clicking the next page menu 510. The reference numeral 511 designates an end menu.

When a target graphic is directly clicked (selected) on this screen through the mouse 105, a new window is opened so that the destination deciding program can be inputted through the keyboard.

FIG. 12 shows an example of the destination deciding program.

The destination deciding program is constituted by simple language. A method may be used in which a display means for displaying a graphic provided with a destination deciding program is directly designated by the identification number in the display means. Further, a method may be used in which the display means is indirectly designated by a calculation formula. For example, the finally converted and set value of $HYOUJISAKI becomes the identification number given to the subsidiary workstation 110 or 111 which becomes a means for displaying the graphic.

In the destination deciding program, the screen condition and the page of the currently displayed graphic are examined through special variables. For example, a value representing the period in which the currently operated graphic is displayed on the display means is stored in a variable $TIME. The identification number for the display means on which the currently operated graphic is displayed is stored in a variable $SCREEN.

When, for example, the display means of the identification number 1 is currently operated and the display means of the identification number 2 is set to a destination, the following destination deciding program is set.

if($SCREEN==1){$HYOUJISAKI=2}

After the destination deciding program is inputted, the input window is closed and then the situation of the procedure is turned back to the initial screen (FIG. 11).

When the "end" icon 511 is clicked after the setting of the program for deciding a destination of the graphic to be set is finished as described above, the display data and the destination deciding program are reserved in a disk device (not shown). A special program which is called "empty program" is set to the graphic with respect to which the destination deciding program is not set specially.

Figure 13:
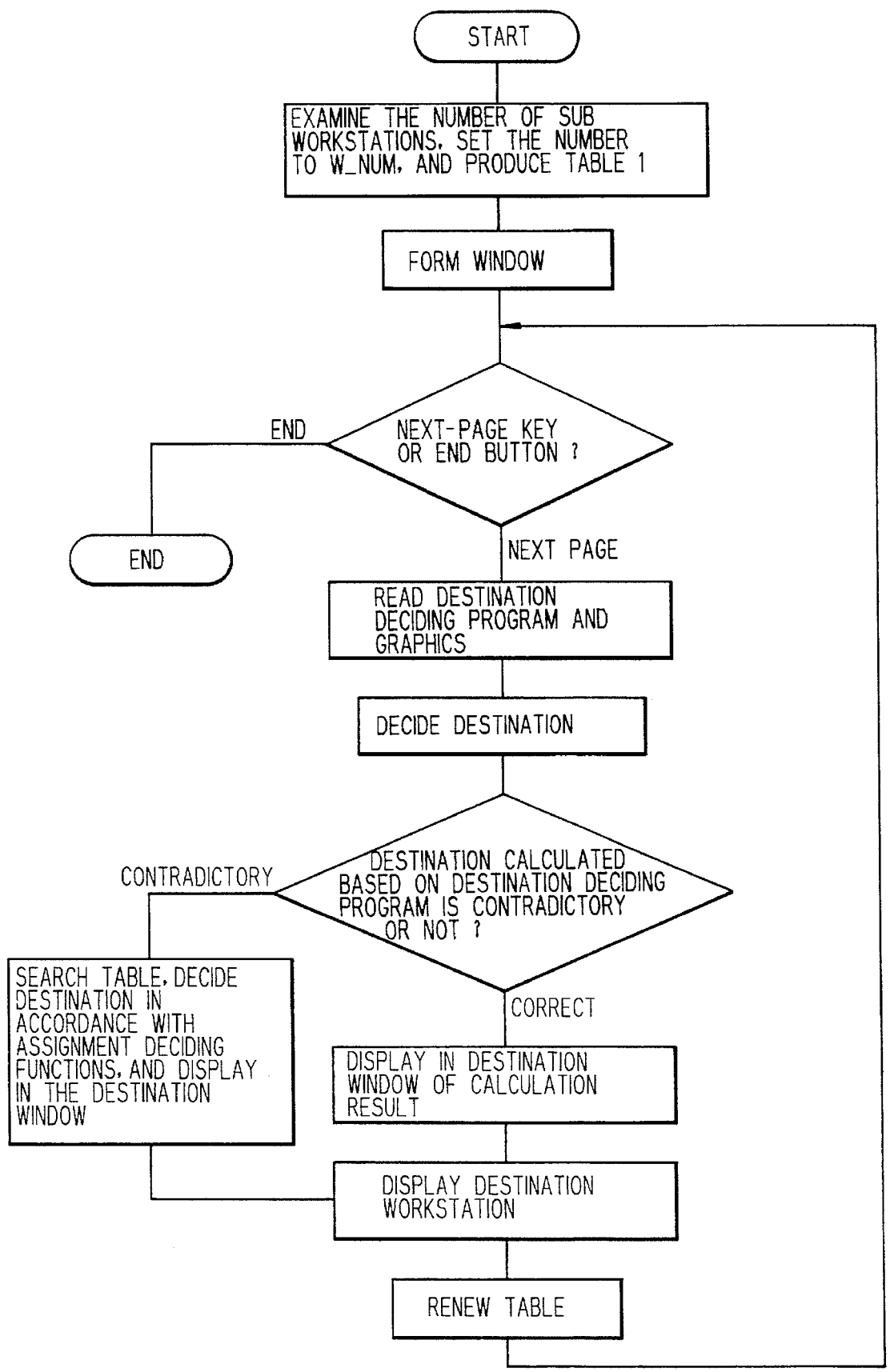
FIG. 13 is a flow chart in the case where a computer program as an assignment deciding function is executed.

In the following, a flow of the procedure in the case where the destination deciding program is used is described with reference to FIGS. 7, 12 and 13. FIG. 12 shows destination deciding programs used in this example. In FIG. 12, the reference numerals 601, 602 and 603 designate graphics. The reference numerals 611, 612 and 613 designate destination deciding programs. FIG. 13 shows processing algorithm. In FIG. 13:

(1) When the No. 1 program (130) is started, the number (2) of subsidiary workstations 110 and 111 connected is first examined to generate a table having a structure as shown in Table 1. In the table, "index" represents the identification number for identifying the subsidiary workstations 110 and 111, and "field" represents a point of time at which the current graphic was displayed on the display means. As an initial state of the table, present time is set to the fields of all indexes. Let the number of windows be W_NUM. In this case, W_NUM is 2.

(2) Further, the No. 1 program (130) generates two windows on the display 102 of the main workstation 101 correspondingly to the subsidiary workstations 110 and 111. In short, one window corresponds to one subsidiary workstation. When information is displayed on the subsidiary workstations 110 and 111, the same information is displayed in the corresponding windows on the main workstation 101.

(3) The presenter performs setting of a destination deciding program before presentation is started. The setting is made by inputting the number given to the destination deciding program to be set, through the keyboard 103 of the main workstation 101. In the case where nothing is set, a pattern in which the longest one in display time is preferentially replaced by a new one is used as a program by default.

It is now assumed that the assignment deciding function of this default is used.

(4) In the case where a graphic is to be displayed, the presenter pushes the "next scene" button 201 to instruct the No. 1 program (130) to display the graphic.

(5) The No. 1 program (130) finds the index in which the difference between the field value and the present time takes a maximum value, by searching the table 1 in the ascending order of the index number. Let the index be the next display means A. The graphic to be displayed and the destination deciding program are read from a disk device (not shown) and then the destination deciding program is started. As a result, the variable $HYOUJISAKI representing the identification number for identifying the subsidiary workstation used for displaying the graphic is calculated. If the destination deciding program is empty, the program is set as follows.

$HYOUJISAKI=W_NUM (6) If the relation $HYOUJISAKI>W_NUM or $HYOUJISAKI<0 is satisfied, the graphic is sent to the previously decided display means A.

If the relation is not satisfied, the graphic is sent to the display means represented by $HYOUJISAKI. In any case, the graphic is also displayed in the corresponding window of the main workstation 101. when the destination deciding program is not set or when the destination deciding program is strange, a suitable procedure is carried out by the assignment deciding function.

(7) The No. 2 program (132) receives the graphic and draws the same graphic as drawn in the window of the main workstation 101.

(8) The No. 1 program (130) gives the present time to the field in the table.

(9) A series of operations shown in the paragraphs (4) to (7) is carried out whenever graphic display is designated by the presenter.

Specifically, when the graphic 1 (601) is displayed, the destination deciding program 1 (611) is calculated, so that a value 1 is saved to $HYOUJISAKI. Accordingly, the graphic 1 (601) is displayed in the window of identification number 1 on the display 102 of the main workstation 101. At the same time, the graphic 1 is sent to the subsidiary workstation 0 (110) through the network 104 or to the program 2 (132) and displayed on the large-scale display 0 (120).

As a result of calculation of the destination deciding program 2 (612), a value 2 is saved to $HYOUJISAKI because $SCREEN is 1 at the time of the calculation, that is, the identification number for the window used currently is 1. Accordingly, the next graphic 2 (602) is sent to the subsidiary workstation 1 (111) and displayed on the large-scale display 1 (121). As a result of the designation deciding program 3 (613), $HYOUJISAKI is 3 and larger than W_NUM. Accordingly, the graphic 1 (601) displayed on the window of the identification number 1 for a long time is regarded as a subject of change, so that the graphic 3 (603) is sent to the subsidiary workstation 0 (110) and displayed on the large-scale display 0 (120).

As described above, the destination of the next graphic can be automatically decided correspondingly to the display condition of the present graphic by the presenter's carrying out the operation of turning over the graphics to a new one. In short, graphic display is made correspondingly to the process of presentation.

In the following, an example of more complex screen assignment is described with reference to FIG. 14.

In some graphic, the state of the graphic cannot be known before the graphic is displayed in practice. This is the case where a part of the graphic can be operated through the mouse cursor so that a part of the graphic as to display color, position, etc. can be changed.

For example, FIG. 14 shows the case where three sides of the population problem of the world are mentioned in the presentation thereof. It is now assumed that the presenter judges by the atmosphere of the place and the subject of audiencer's interest whether the topic of conversation is to be explained in detail or whether the topic of conversation is to be changed.

At a certain point of time, the food problem as the second topic of the population problem is picked by using the mouse in order to explain the population problem more in detail. Then, while this topic is highlighted, an illustration for explaining the food problem as a topic of the population problem in detail is drawn in the right end of the graphic. In the illustration, a telop (television opaque projection) of related information may be provided. When the "next scene" button is pushed after the food problem is explained thoroughly, the topic is changed to the "graphic 2". At this time, the "graphic 1" explained in detail is left on a destination of display, and the "graphic 2" is displayed on another destination of display.

In presentation on another day, the topic may be changed to the "graphic 2" by pushing the "next scene" button soon after the "graphic 1" is explained in brief. At this time, the "graphic 1" is perfectly replaced by the "graphic 2".

In the aforementioned graphic, the state of the graphic is not yet decided when the graphic is generated. Accordingly, in the case where screen assignment for the graphic is made correspondingly to the state of the graphic, a judgment cannot be made at the point of time when the graphic is generated.

Therefore, to cope with such a case, a result in the case where the graphic is manipulated is so reflected in some variable that the value of the variable can be examined from the destination deciding program for the next graphic. This variable is called "situation variable".

For example, it is now assumed that a value 1 is saved to the situation variable %HENKA of the "graphic 1" when the graphic is manipulated to be highlighted and explained in detail, and that a value 0 is saved to %HENKA when the graphic is not manipulated.

On the basis of the value of %HENKA, the destination deciding program of the "graphic 2" is represented by the formula:

```
if(%HENKA==0){$HYOUJISAKI=
    $SCREEN}else{$HYOUJISAKI=mod($SCREEN+1,W_
    NUM+1)}
``` in which mod(x,y) represents a function for calculating remainder obtained by dividing x by y. By the program, the destination of the next display data can be changed correspondingly to the change of the preceding graphic.

In the following, an embodiment in which a plurality of graphics are displayed on display means at the same time or displays on display means are changed at the same time is described with reference to FIG. 15.

Figure 15:
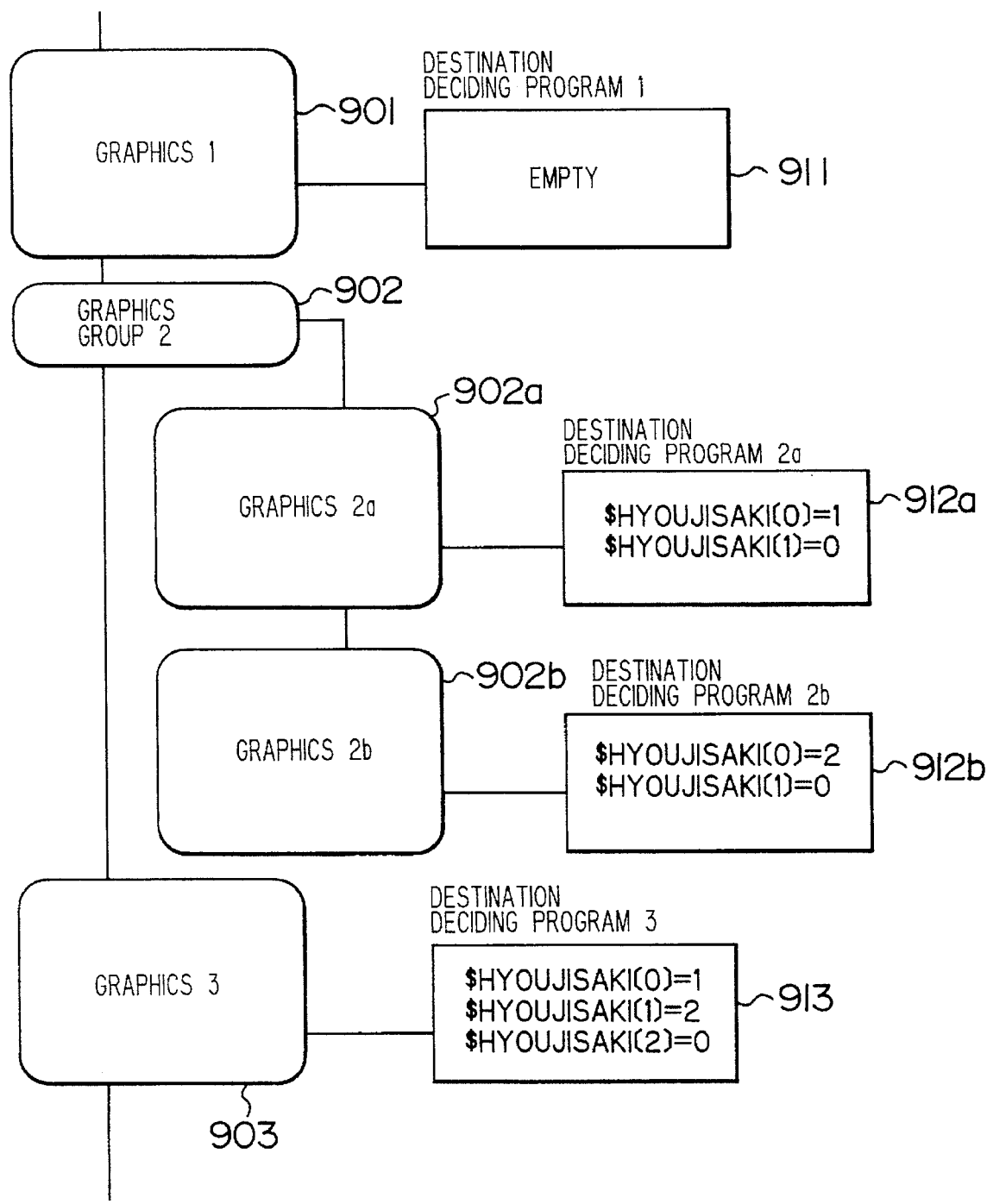
FIG. 15 is an explanatory view showing presentation information and computer programs as an assignment deciding function in the case where a plurality of display means are changed simultaneously.

In FIG. 15, the reference numerals 901, 902a, 902b and 903 designate graphics. The reference numeral 902 designates a graphic group. The reference numerals 911, 911a, 912b and 913 designate destination deciding programs.

Although the above description is made on the case where one graphic is provided on a display means whenever the "next scene" button is pushed, new graphics may be provided at the same time on a plurality of display means in some presentation. Or one graphic may be provided on a plurality of display means.

For the purpose of such presentation, the concept "group" is introduced into the form of display data so that a destination deciding program can take a plurality of output values representing a plurality of display means.

The "group" is a concept for generalizing a plurality of graphics. Graphics included in one group are simultaneously displayed after display means are simultaneously decided when a next scene request is given.

A destination deciding program takes a plurality of output values representing a plurality of display means as follows. Let $HYOUJISAKI be an array. When a numeral of 1 or more is included in $HYOUJISAKI[0], $HYOUJISAKI[1], ..., the numeral is regarded as the identification number for identifying the display means so that one graphic is displayed on the plurality of display means. If 0 is included in an array, the identification number given to arrays following the array is neglected.

In the following, a flow of a procedure is described with reference to an example of display data by using the "group" as shown in FIG. 15 and designation of a plurality of display means. A function by default is used as an assignment deciding function.

The graphic 1 (901) is displayed on the display means of the identification number 1, because the destination deciding program is empty 911 and the graphic 1 is the first in order. When the "next scene" button 201 is pushed, destination deciding programs (912a, 912b) of graphics 2a (902a) and 2b (902b) included in the graphic group 2 (902) are calculated to display the graphic group 2 (902). First, $HYOUJISAKI[0] of the graphic 2a (902a) is calculated to 1 and then $HYOUJISAKI[1] to 0. The destination of the graphic 2b (902b) is calculated as follows.

$HYOUJISAKI[0]=2
$HYOUJISAKI[2]=0

As a result, the graphic 2a (902a) and the graphic 2b (902b) are simultaneously displayed on the display means of identification number 1 and the display means of identification number 2, respectively.

Then, the destination deciding program of the graphic 3 (903) is calculated as follows.

$HYOUJISAKI[0]=1
$HYOUJISAKI[1]=2
$HYOUJISAKI[2]=0

As a result, the graphic 3 (903) is displayed on the display means of the identification numbers 1 and 2, simultaneously.

Although the above description is made on the case where two subsidiary workstations are used for presentation, the present invention can be applied to the case where three or more subsidiary workstations are used.

Figure 16:
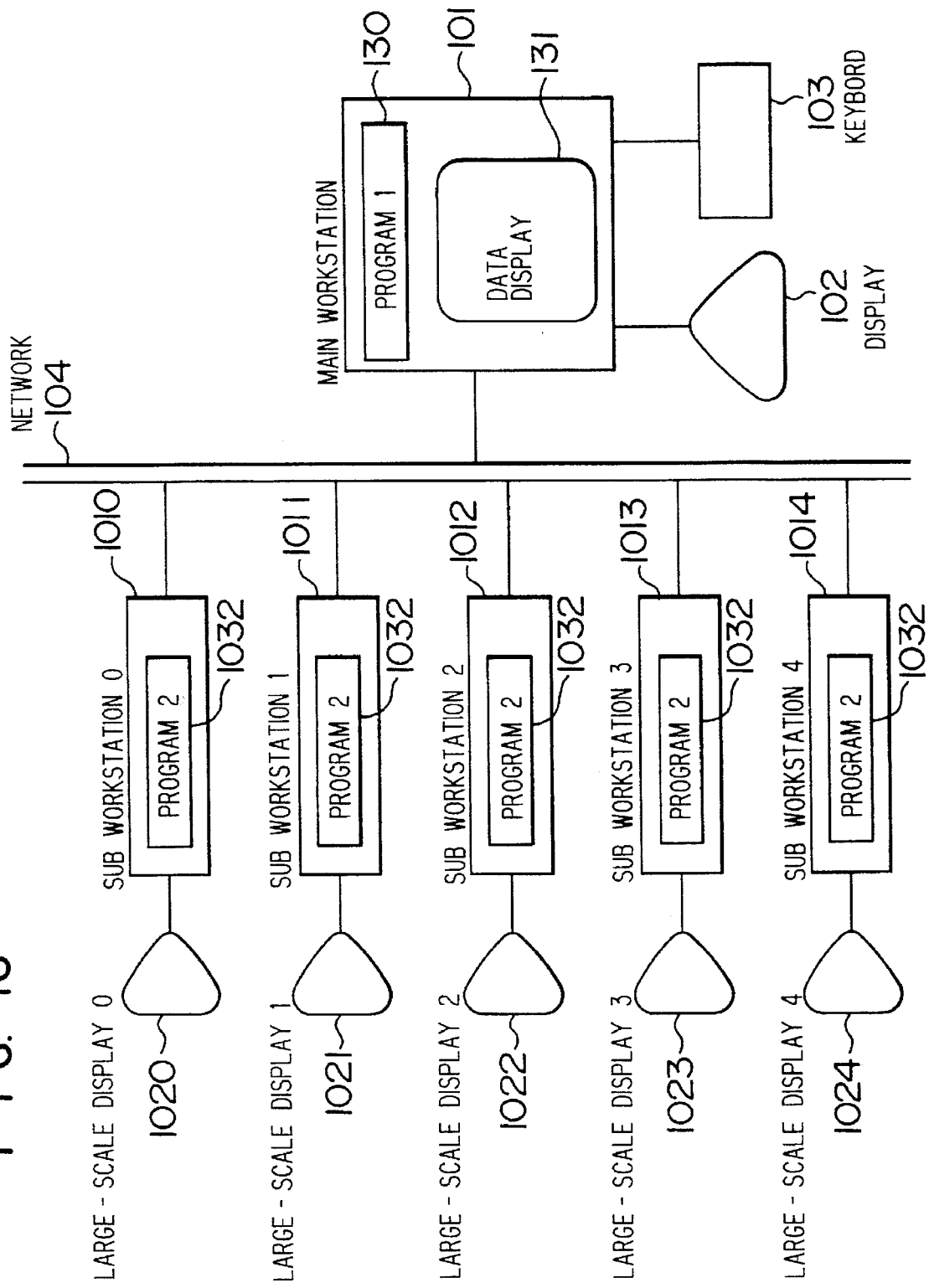
FIG. 16 is a block diagram of a presentation system using a plurality of display means as a fifth embodiment of the present invention.

FIG. 16 shows a presentation supporting apparatus as a fifth embodiment of the present invention.

In FIG. 16, a workstation 101 capable of high-precision graphic display is used as a body of a presentation system. A plurality of subsidiary workstations 1010 to 1014 are connected thereto through a network 104. Large-scale displays 1020 to 1014 are connected to the subsidiary workstations, respectively.

A program 1 (130) for controlling presentation and presentation data (131) are stored in the main workstation 101. Here, the next page key and the mouse of FIG. 7 are omitted in the drawing for convenience of description. It is now assumed that this system is operated by using the keyboard 103. The display data 131 are collected by pages and numbered in the order of pages to be displayed.

A program 2 (1032) for receiving data from the main workstation 101 and for displaying the data on the large-scale displays 1020–1024 is stored in the subsidiary workstations 1010–1014.

In this embodiment, a function in which graphics are assigned to the subsidiary workstations and displayed thereon serially in the order of displays determined by the presenter in advance is used as an assignment deciding function. Of course, there is no necessity of the presenter's determining the order of displays, if a function in which graphics are assigned in the order of the display number is used as a function by default.

(1) When the program 1 (130) is started, the number of subsidiary workstations connected is first examined to generate a table having a structure as shown in Table 2. In the table, "index" represents a destination of display, that is, the index having a field value 1 represents the next destination of display. As an initial state of the table, 0 is set to the fields of all indexes, except that 1 is set to the field of the index 0.

TABLE 2

| Index | 0 | 1 | 2 | 3 | 4 |
|-------|---|---|---|---|---|
| Field | 1 | 0 | 0 | 0 | 0 |

(2) Further, the program 1 (130) generates a number of windows on the display 102 of the main workstation 101 correspondingly to the number of the subsidiary workstations. In short, one window corresponds to one subsidiary workstation. When information is displayed on a subsidiary workstation, the same information is displayed in a corresponding window on the main workstation.

(3) When a graphic is to be displayed, the presenter pushes a next page button or page setting button on the keyboard 103 to instruct the program 1 to display the graphic.

(4) The program 1 (130) finds the index having the field value 1 by searching the table 2 in the ascending order of the index number. Let the index be A. The graphic to be displayed is read from a disk device (not shown) and then written in the window having identification number A. At the same time, the same graphic is sent to a subsidiary workstation 110 or 111 corresponding to the window. Then, graphic data to be displayed is read from a storage device such as a disk device (not shown) and written in the window having the index thus found. At the same time, the same graphic data is sent to a subsidiary workstation corresponding to the window.

The program 2 (1032) receives the graphic data and draws the same graphic as drawn in the window of the main workstation 101.

(5) The program 1 (130) sets 0 in the field having the value 1 in the table and sets 1 in the field of the next index. When the next index does not exist, that is, when the search of the table is finished up to the last index, 1 is set in the field of the index 0.

(6) A series of operations shown in the paragraphs (4)–(5) is carried out whenever graphic display is designated by the presenter.

As described above, graphics are automatically assigned to destinations by the presenter's repeating the operation of turning over the graphics to a new one.

Figure 17:
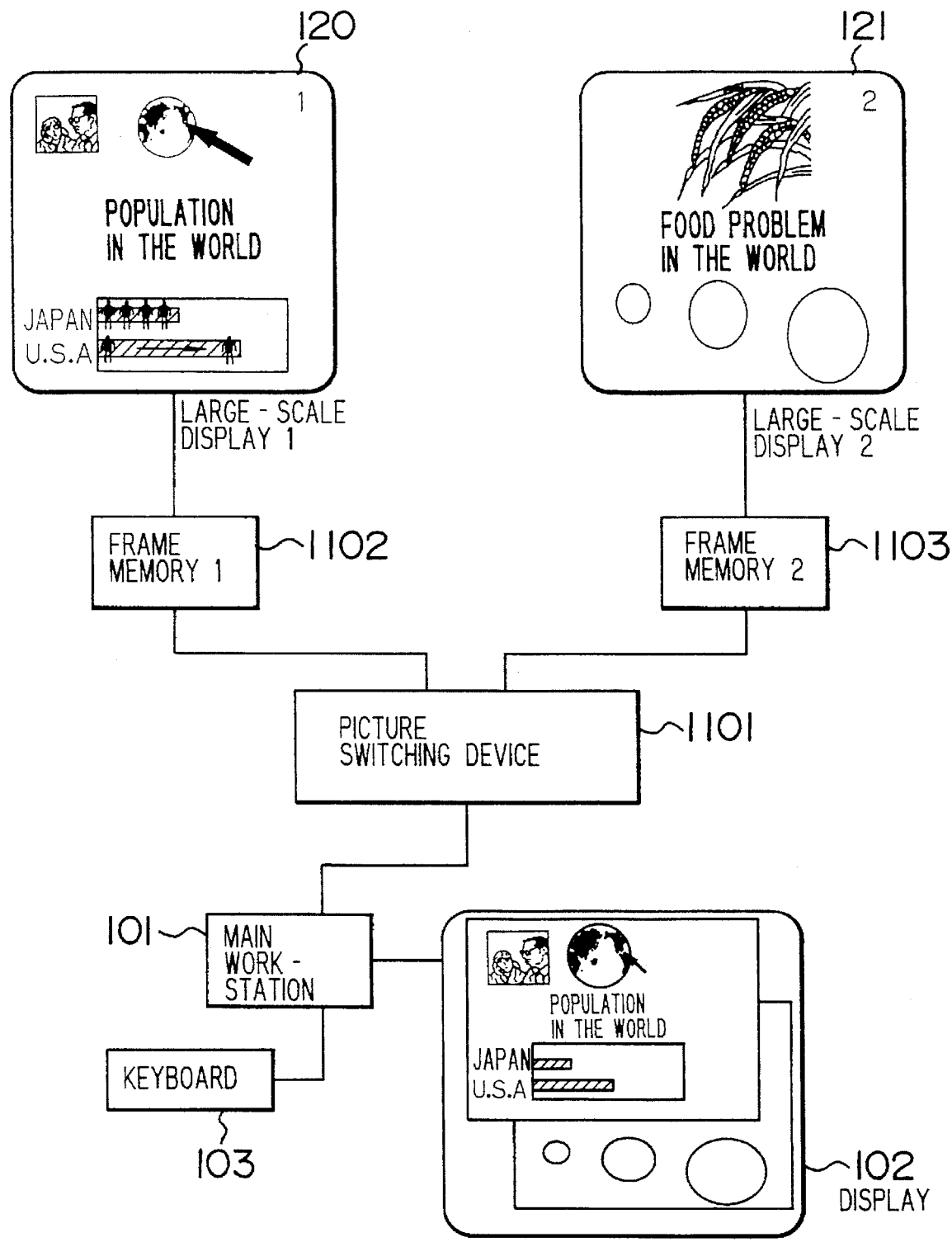
FIG. 17 is an explanatory view showing an example in which the plurality of workstations are replaced by frame memories.

In the following, a method for providing a multi-screen presentation system low in cost is described with reference to FIG. 17. In FIG. 17, the reference numerals 1102 and 1103 designate frame memories. The reference numeral 1101 designates a picture switching device.

A plurality of large-scale displays 120 and 121 are connected to one workstation through the picture switching device 1101 which can be controlled by a program. The large-scale displays 120 and 121 respectively have the frame memories 1102 and 1103 capable of storing a picture signal of one frame or more. The storage of the picture signal in the frame memories can be controlled from the workstation.

Although the aforementioned embodiments except that this embodiment have shown the case where graphic data are sent to the subsidiary workstations 110 and 111 through the network 104, this embodiment shows the case where the picture signal is directly sent to the large-scale displays 120 and 121 by the switching operation of the picture switching device 1101. After an instruction to store the present picture is given to the large-scale displays 120 and 121, the picture switching device 1101 is operated.

By the aforementioned method, a screen assignment system according to the present invention can be provided without use of any expensive workstation though two or more pictures cannot be moved at the same time.

Although above description is made on the case where a button type next page key is used as means for perceiving the next scene request, the progress of presentation without notice of the button on the way of presentation may be required. In the following, a method for conducting the progress with a gesture instead of the button is described.

To conduct the progress with a gesture, a system for interpreting the gesture of the presenter and for converting the gesture into a next scene request is required.

A method of perceiving the gesture of the presenter is considered. For example, the posture or motion of a human being is perceived by utilizing the phenomenon that the transmission of light changes when a joint is moved while a human body is covered with optical fiber. However, in the case of presentation, "what display is a subject of explanation" is an important thing. Accordingly, the method of perceiving the next scene request by only a pause may be inaccurate.

Accordingly, where the presenter sees and what pause the presenter takes can be known by combination of this method and a method in which a gyro is attached to examine the method of the presenter. This combination is more effective. For example, the load imposed on the presenter is further lightened by a system in which a next scene request is produced so that the next graphic is assigned to a display means when the presenter's hand is waved toward the display means.

In the following, an embodiment in which the screen assignment system according to the present invention is applied to a process control monitor is described with reference to FIG. 18. In FIG. 18, the reference numerals 1201 and 1202 designate monitoring large-scale displays. The reference numeral 1203 designates a central monitor. One workstation is connected to each of the large-scale displays. The workstation of the central monitor is connected to the display-side workstations through a network. The reference numeral 1205 designates various kinds of sensors through which process control apparatus are monitored by the central monitor. The reference numeral 1206 designates a next page key which is used by a watchman.

In general, the watchman can see a necessary graphic by pushing the next page key 1206. In this case, the graphic is not stationary but changes dynamically. Therefore, not only the graphic contains information such as picture information, graphic information and character information but the graphic has a data structure called "output object" by which a value received from the sensor 1206 is reflected in the display of the graphic.

The output object holds an output destination and a program for defining the reflection of the value received from the sensor 1205 in characters and graphics in the output destination.

When, for example, the value of 100 is received from the sensor 1205, the value is transmitted to the output object A so that the output object sets the string of "100" to a string display area A. As a result, the numeral of 100 is displayed in the string display area.

In the aforementioned process control monitor, the watchman must change the displays according to the change of the situation as well as must obtain information, by pushing the next page key 1206. In this case, means for producing a next scene request on the basis of the value of the sensor 1205 is provided. This can be attained by providing means of judging whether the value of the sensor 1205 is over a set value, in a program portion which monitors whether the next page key 1206 is pushed or not.

Accordingly, also in the aforementioned dynamic process control monitor, displays can be assigned flexibly to be monitored according to the subjectivity of the watchman as well as the change of the situation. Accordingly, a system being friendly to the user can be formed.

Having described the presentation system and the process control monitor as embodiments of the present invention, it is a matter of course that the present invention is not limited to the specific embodiments and that the present invention can be generally and widely applied to the screen assignment system for switching a plurality of screens to display information.

As described above, smooth and effective display presentation and the like can be made without one-by-one designating display graphics and media by the presenter, watchman, etc.

What is claimed is:

1. A presentation supporting method for performing presentation while displaying information on a presenter-site screen and at least one audience-site screen, comprising the steps of:

a) storing together, in a non-volatile storage device in advance, sequential presentation information corresponding to a presentation program and predetermined additional information, with each said additional information representing dynamically changing information corresponding to different sequential presentation points over time within said sequential presentation information, and wherein said additional information is dynamically changing supporting information related to a presentation on said presenter-site screen for supporting the presenter at said different sequential presentation points over time when presentation is made, and said additional information includes supplementary information for supporting presentation, said supplementary information including at least one of audience response and narration information which is dynamically changing when presentation is performed;

b) reading a next sequential presentation information from said storage device and displaying said next sequential presentation information on both of said audience-site screen and said presenter-site screen when presentation is made; and c) reading said additional information corresponding to said next sequential presentation information from said storage device and displaying said additional information on said presenter-site screen.

2. A presentation supporting method according to claim 1, in which said presentation information is drawing information, and when said drawing information is displayed on both of said audience-site screen and said presenter-site screen, said drawing information to be displayed on said presenter-site screen is converted so as to reduce a quantity of information.

3. A presentation supporting method according to claim 1, in which said additional information corresponds to at least one of a content, and desired audience response with respect to said different sequential presentation points within said sequential presentation information.

4. A presentation supporting method according to claim 1, in which said sequential presentation information and respective supporting information for supporting the presenter correspond to scene changes within a presentation of said presentation program on said audience-site screen and said presenter-site screen.

5. In a presentation system for performing presentation while displaying information on a presenter-site screen and at least one audience-site screen, a presentation supporting apparatus comprising:

a presentation program apparatus for storing and supplying predetermined sequential presentation information corresponding to a presentation program, and including additional information for a presenter and presentation information for said presenter and an audience, with each said additional information for said presenter representing dynamically changing information corresponding to different sequential presentation points over time within said presentation program;

an input control device for issuing a display command;

a plurality of parallel information generating devices for temporarily storing said additional information for said presenter and said presentation information for said presenter and said audience in accordance with the command given from said input control device and for giving display attributes corresponding to the characteristics of said presentation information and said additional information, in which each said additional information is dynamically changing supporting information corresponding to different sequential presentation points over-time within sequential presentation information and is for supporting the presenter at said different sequential presentation points when presentation is made, and said additional information includes supplementary information for supporting presentation, said supplementary information including at least one of, audience response and narration information which is dynamically changing while presentation is performed;

a screen designation device for storing a name of an information generating device correspondingly to one of said additional information and said presentation information when said one of said additional information and said presentation information is stored in said information generating device; and an information display selecting device for selecting one of said presenter-site screen and said audience-site screen correspondingly to the name of said information generating device stored in said screen designation device.

6. A presentation supporting apparatus according to claim 5, in which said input control device includes an input section provided on said presenter-site screen to issue a display command, and a presentation control section for controlling said plurality of information generating devices in accordance with the command given from said input section.

7. A presentation supporting apparatus according to claim 6, in which said plurality of information generating devices include a presentation information generating section for storing said presentation information in accordance with a command given from said presentation control section and for giving a display attribute to said presentation information correspondingly to the characteristic of said presentation information, and at least one additional information generating section for storing said additional information in accordance with a command given from said presentation control section and for giving a display attribute to said additional information correspondingly to the characteristic of said additional information.

8. A presentation supporting apparatus according to claim 7, in which said presentation information generating section and said additional information generating section are connected to a presentation information storage device in which said presentation information and said additional information are stored, and said presentation information generating section and said additional information generating section store said presentation information and said additional information, respectively, in accordance with a command given from said presentation control section.

9. A display assignment system for assigning mutually different predetermined presentation information to different groups of audience-site screens located at a common audience site so as to concurrently present different presentation information on said different groups of audience-site screens to each audience member when a presenter makes presentation by using said audience-site screens, said system comprising:

a presentation program apparatus for storing and supplying predetermined sequential presentation information corresponding to a presentation program and predetermined additional information, with each said additional information representing dynamically changing information corresponding to different sequential presentation points over time within said sequential presentation information, and wherein said additional information is dynamically changing supporting information related to a presentation on said presenter-site screen for supporting the presenter at said different sequential presentation points over time when presentation is made;

a plurality of display means each of which has a screen for displaying said presentation information;

a screen assignment means for issuing a command to assign a display of mutually different presentation information to different groups of said display means located at a common audience site on a basis of generation of a next sequential presentation information; and a control means having a plurality of assignment deciding functions for assigning the display of said mutually different presentation information to different groups of said display means located at said common audience site in accordance with said command.

10. A display assignment system according to claim 9, in which said assignment deciding functions decide assignment at a point of time when said screen assignment means issues an assignment command, to display said next sequential presentation information on a different group of display means located at said common audience site which is longest in a period of display of presentation information from among a plurality of different groups of display means subjected to the display of presentation information.

11. A display assignment system according to claim 9, in which said assignment deciding functions decide assignment at a point of time when said screen assignment means issues an assignment command, to display said next sequential presentation information on a different group of display means located at said common audience site which is shortest in a period of manipulation of the presenter from among a plurality of display means subjected to the display of presentation information, to display said next sequential presentation information on a different group of display means in which presentation information being lowest in the frequency of use among all presentation information displayed is displayed.

12. A display assignment system according to claim 9, in which said assignment deciding functions are computer programs which decide assignment at a point of time when said screen assignment means issues an assignment command, to display next sequential presentation information on a different group of display means located at said common audience site which is longest in a period of display of presentation information from among a plurality of different groups of display means subjected to the display of presentation information or to display said next sequential presentation information on a display means which is shortest in a period of manipulation of the presenter from among the plurality of display means subjected to the display of presentation information, to display said next sequential presentation information on a display means in which presentation information being lowest in the frequency of use among all presentation information displayed is displayed.

13. A display assignment system according to claim 12, in which said computer programs have situation variables for the display of presentation information correspondingly to the screens of the display means, to assign any one of said different groups of display means on the basis of a situation variables.

14. A display assignment system according to claim 12, in which said computer programs serve to assign a group of said presentation information to the plurality of display means simultaneously.

15. A display assignment system according to claim 9, in which said assignment deciding functions decide an assignment at a point of time when said screen assignment issues an assignment command to display said next sequential presentation information on a predetermined different group of display means located at said common audience site on a basis of the contents of said next sequential presentation information.

16. A display assignment system according to claim 9, in which said assignment deciding functions serve to assign said different groups of display means in a predetermined order.

17. A display assignment system according to claim 9, in which said assignment deciding functions form correspondence between the respective presentation information and said different groups of of display means.

18. A display assignment system according to claim 9, in which said screen assignment means includes means for designating said next sequential presentation information directly from the outside.

19. A display assignment system according to claim 9, further comprising means for changing said different groups of display means assigned by the control means for deciding presentation information on a basis of the assignment deciding functions.

20. A display assignment system according to claim 9, in which a predetermined key is used as the screen assignment means.

21. A display assignment system according to claim 9, in which means for perceiving a predetermined motion of the user is used as said screen assignment means.

22. A display assignment system according to claim 21, in which said means for perceiving perceives a next scene request by a predetermined motion of the user to thereby assign said different group of display means on a basis of a directional movement of the user.

23. A display assignment system according to claim 9, further comprising a detecting means for detecting the contents of information displayed on the display means when said contents change dynamically to thereby make a request for the next presentation information in accordance with the operation of said detecting means.

24. A display assignment system according to claim 23, in which when the contents of said detecting means are over a predetermined value, the request for the next presentation information is made.

25. A display assignment method for assigning predetermined presentation information to any one of audience-site screens located at a common audience site so as to concurrently present different presentation information on different groups of audience-site screens to each audience member when a presenter makes presentation by using said audience-site screens, said method comprising the steps of:

storing and supplying predetermined sequential presentation information corresponding to a presentation program and predetermined additional information, with each said additional information representing dynamically changing information corresponding to different sequential presentation points over time within said sequential presentation information, and wherein said additional information is dynamically changing supporting information related to a presentation on said presenter-site screen for supporting the presenter at said different sequential presentation points over time when presentation is made;

inputting a command for displaying mutually different presentation information of said predetermined sequential presentation information on said different groups of said audience-site screens said different groups being located at said common audience site; and making assignment for displaying said mutually different presentation information on different groups of said audience-site screens in accordance with said command by any one of assignment deciding functions.

26. A display assignment method according to claim 25, in which said assignment deciding functions display a next sequential presentation information by replacing a different group of said audience-site screens located at said common audience site which is longest in a period of display of presentation information from among said audience-site screens.

27. A display assignment method according to claim 25, in which said assignment deciding functions display a next sequential presentation information by replacing a different group of said audience-site screens located at said common audience site which is shortest in a period of display of presentation information from among said audience-site screens.

28. A display assignment method according to claim 25, in which said assignment deciding functions display a next sequential presentation information by replacing a preliminarily designated different group of said audience-site screens located at said common audience site.

* * * * *